United States Patent
Sansalone

(10) Patent No.: US 7,524,422 B2
(45) Date of Patent: Apr. 28, 2009

(54) CLARIFICATION AND SORPTIVE-FILTRATION SYSTEM FOR THE CAPTURE OF CONSTITUENTS AND PARTICULATE MATTER IN LIQUIDS AND GASES

(75) Inventor: John J. Sansalone, Gainesville, FL (US)

(73) Assignee: Unit Process Technologies, LLC, Gainsville, FL (US)

( * ) Notice: Subject to any disclaimer, the term of this patent is extended or adjusted under 35 U.S.C. 154(b) by 0 days.

(21) Appl. No.: 11/843,485

(22) Filed: Aug. 22, 2007

(65) Prior Publication Data

US 2008/0023383 A1   Jan. 31, 2008

Related U.S. Application Data

(60) Continuation of application No. 11/218,677, filed on Sep. 2, 2005, now Pat. No. 7,341,661, which is a continuation-in-part of application No. 10/842,328, filed on May 10, 2004, which is a division of application No. 09/916,171, filed on Jul. 26, 2001, now Pat. No. 6,767,160, which is a division of application No. 09/714,366, filed on Nov. 16, 2000, now Pat. No. 6,468,942, said application No. 11/218,677 is a continuation-in-part of application No. PCT/US2004/028342, filed on Sep. 1, 2004.

(51) Int. Cl.
*C01D 1/42* (2006.01)
(52) U.S. Cl. ..................................... 210/686
(58) Field of Classification Search .................. 210/686
See application file for complete search history.

(56) References Cited

U.S. PATENT DOCUMENTS

| 775,791 | A | 11/1904 | Austin |
| 1,351,607 | A | 8/1920 | Barrett et al. |
| 1,906,494 | A | 5/1933 | Steward |
| 2,773,777 | A | 12/1956 | Alexander et al. |
| 3,418,249 | A | 12/1968 | Pitchford |
| 3,499,837 | A | 3/1970 | Jaunarajs |
| 3,615,798 | A | 10/1971 | Woodruff |

(Continued)

FOREIGN PATENT DOCUMENTS

WO   WO99/50182   10/1999

OTHER PUBLICATIONS

Declaration of Experimental Use by John J. Sansalone; Apr. 23, 2001.

(Continued)

*Primary Examiner*—Chester T Barry
(74) *Attorney, Agent, or Firm*—Jones, Walker, Waechter, Poitevent, Carrere & Denegre, L.L.P.

(57) ABSTRACT

A sorptive-filtration system for removing at least one of negatively or positively charged ions, complexes or particulates from an aqueous stream. The system includes a) flow formed substantially from at least one of rainfall-runoff or snowmelt-runoff; b) a filter containment communicating with the runoff stream such that at least part of the stream passes through the filter containment; and c) a granular filter media disposed within the filter containment, the filter media having an amphoteric material applied thereto, wherein the amphoteric material comprises a metal selected from at least one of Fe, Al, Mn, or Si.

32 Claims, 9 Drawing Sheets

U.S. PATENT DOCUMENTS

| | | | |
|---|---|---|---|
| 3,632,418 | A | 1/1972 | Draper |
| 3,645,177 | A | 2/1972 | Hargett |
| 3,687,021 | A | 8/1972 | Hensley |
| 3,690,227 | A | 9/1972 | Welty |
| 3,707,901 | A | 1/1973 | Bynum et al. |
| 3,740,201 | A | 6/1973 | Woodruff |
| 3,765,783 | A | 10/1973 | Wager |
| 3,817,643 | A | 6/1974 | Azar et al. |
| 3,870,422 | A | 3/1975 | Medico, Jr. |
| 3,884,849 | A | 5/1975 | Molbert |
| 4,049,874 | A | 9/1977 | Aoyama et al. |
| 4,116,709 | A | 9/1978 | La Bate |
| 4,155,654 | A | 5/1979 | Kennepohl et al. |
| 4,167,356 | A | 9/1979 | Constantinescu |
| 4,174,912 | A | 11/1979 | Peterson |
| 4,188,232 | A | 2/1980 | Hall et al. |
| 4,244,747 | A | 1/1981 | Leonard et al. |
| 4,245,026 | A | 1/1981 | Ziolo |
| 4,551,254 | A | 11/1985 | Imada et al. |
| 4,560,620 | A | 12/1985 | Aral |
| 4,629,757 | A | 12/1986 | Esser et al. |
| 4,666,988 | A | 5/1987 | Neill et al. |
| 4,708,516 | A | 11/1987 | Miller |
| 4,801,332 | A | 1/1989 | Selfridge et al. |
| 4,915,539 | A | 4/1990 | Yoshikane et al. |
| 4,986,693 | A | 1/1991 | Salberg et al. |
| 5,286,430 | A | 2/1994 | Downs et al. |
| 5,298,328 | A | 3/1994 | Abe et al. |
| 5,369,072 | A | 11/1994 | Chang et al. |
| 5,374,672 | A | 12/1994 | Chaverot et al. |
| 5,405,213 | A | 4/1995 | O'Connor |
| 5,431,510 | A | 7/1995 | Reinert |
| 5,456,553 | A | 10/1995 | Ii et al. |
| 5,466,407 | A | 11/1995 | Downs et al. |
| 5,558,702 | A | 9/1996 | Chatterjce et al. |
| 5,665,241 | A | 9/1997 | Meada et al. |
| 5,676,488 | A | 10/1997 | Hedblom |
| 5,788,407 | A | 8/1998 | Hwang |
| 5,803,662 | A | 9/1998 | Gunter |
| 5,810,510 | A | 9/1998 | Urriola |
| 5,853,846 | A | 12/1998 | Clark et al. |
| 5,855,790 | A | 1/1999 | Bradbury et al. |
| 5,906,454 | A | 5/1999 | Medico, Jr. et al. |
| 5,928,418 | A | 7/1999 | Tamaki et al. |
| 5,980,843 | A | 11/1999 | Silversand |
| 5,989,417 | A | 11/1999 | Fleischhacker |
| 6,102,613 | A | 8/2000 | Medico, Jr. et al. |
| 6,113,978 | A | 9/2000 | Ornstein et al. |
| 6,114,418 | A | 9/2000 | Isobe et al. |
| 6,146,051 | A | 11/2000 | Pratt |
| 6,206,607 | B1 | 3/2001 | Medico, Jr. et al. |
| 6,217,252 | B1 | 4/2001 | Tollier et al. |
| 6,293,065 | B1 | 9/2001 | Suzuki et al. |
| 6,468,678 | B1 | 10/2002 | Dahlin et al. |
| 6,960,046 | B2 | 11/2005 | Kang |

OTHER PUBLICATIONS

American Water Works Association Journal, vol. 86, No. 8; Aug. 1994; Effect of Iron Oxide Coating on Sand Filtration; V. Susie Stenkamp and Mark M. Benjamin; pp. 37-51.

Wat. Sci. Tech. vol. 32, No. 1; 1995; An Infiltration Device as a Best Management Practice for Immobilizing Heavy Metals in Urban Highway Runoff; J.J. Sansalone and S.G. Buchberger; pp. 119-125.

Transportation Research Record 1483; 1995; Correlations Between Heavy Metals and Suspended Solids in Highway Runoff; Implications for Control Strategies; John J. Sansalone, Steven G. Buchberger, and Margarete T. Koechling; pp. 112-119.

1996; Cincinnati, Ohio; Adsorptive Infiltration by Oxide Coated Sand Media for Immobilizing Metal Elements in Runoff; John Joseph Sansalone.

The Science of the Total Environment, 189/190; 1996; Fractionation of Heavy Metals in Pavement Runoff; John J. Sansalone, Steven G. Buchberger, and Souhail R. Al-Abed; pp. 371-378.

Transportation Research Record 1523; 1996; Characterization of Metals and Solids in Urban Highway Winter Snow and Spring Rainfall-Runoff; John J. Sasalone and Steven G. Buchberger; pp. 147-159.

Wat. Sci. Tech. vol. 36, No. 8-9, 1997; Characterization of Solid and Metal Element Distributions in Urban Highway Stormwater; John J. Sansalone and Steven G. Burchberger; pp. 155-160.

Journal of Environmental Engineering; Feb. 1997; Partitioning and First Flush of Metals in Urban Roadway Storm Water; John J. Sansalone and Steven G. Buchberger; pp. 134-143.

Journal of Environmental Engineering; Jul. 1997; Method for Coating Filter Media with Synthetic Manganese Oxide; Peter B. Merkle, William R. Knocke, and Daniel L. Gallagher, pp. 642-649.

Transportation Research Record 1601; Nov. 1997; Relationship Between Particle Size Distribution and Specific Surface Area of Urban Roadway Stormwater Solids; John J. Sansalone, Steven G. Buchberger,Joseph M. Koran and Joseph A. Smithson; pp. 95-108.

Journal of Environmental Engineering; May 1998; Physical Characteristics of Urban Roadway Solids Transported During Rain Events; John J. Sansalone, Joseph M. Koran, Joseph A. Smithson; and Steven G. Buchberger; pp. 427-440.

Journal of Environmental Engineering; May 1998; Charaterization of Solids Transported from and Urban Roadway Surface; John J. Sansalone, Joseph M. Koran, Joseph A. Smithson, and Steven G. Buchberger; pp. 481-491.

Transportation Research Record 1647, Nov. 1998; Development and Testing of a Partial Exfiltration Trench for in Situ Treatment of Highway Drainage; John J. Sansalone, Joseph A. Smithson, and Joseph M. Koran, pp. 34-42.

The Science of the Environment 235; 1999; Adsorptive Infiltration of Metals in Ubran Drainage Media Characteristics; John J. Sansalone; pp. 179-188.

Wat. Sci. Tech vol. 39, No. 2; 1999; In-Situ Performance of a Passive Treatment System for Metal Source Control; John J. Sansalone; pp. 193-200.

Journal of Environmental Engineering; Jun. 1999; Variably Saturated Flow in Storm-Water Partial Exfiltration Trech; Yanbo Li, Steven G. Buchberger, and John J. Sansalone,; pp. 556-562.

Nov. 18, 1999; Baton Rouge, Louisiana; Temporal Variations in Heavy Metal Partitioning and Loadings in Urban Highway Pavement Sheet Flow Implications for In-Situ Treatment Design; John J. Sansalone and Donald W. Glenn, III.

Nov. 10, 2000; Baton Rouge, Louisiana; A Granulometry-Based Selection Methodology for Separation of Traffic-Generated Particles in Highway Snowmelt Runoff; Chad Cristina, Jarrod Tramonte and John J. Sansalone.

Journal of the American Concrete Institute; Oct. 1947, vol. 19, No. 2; Cement-Aggregate Reaction in Concrete; McConnel, et al.

Nicholas J. Garber and Lester A. Hoel, Traffic and Highway Engineering Book, 4 pgs., Brooks/Cole Publishing Company, Pacific Grown, CA, no date.

Tom Kazmierowski, Pamela Marks and Stephen Lee, Ten Year Performance Review of In-Situ Hot Mix Recycling in Ontario, Paper, 1999, 14 pgs., Ontario Canada.

S.Q.S. Lee and J.M. Corteau, New Asphalt Technologies, Paper, 1998, 7 pgs., Ontario Canada.

Jean-Martin Croteau and Stephen O.S. Lee, Cold In-Place Recycling Performance and Practices, Paper, 1997, 13 pgs., Ontario, Canada.

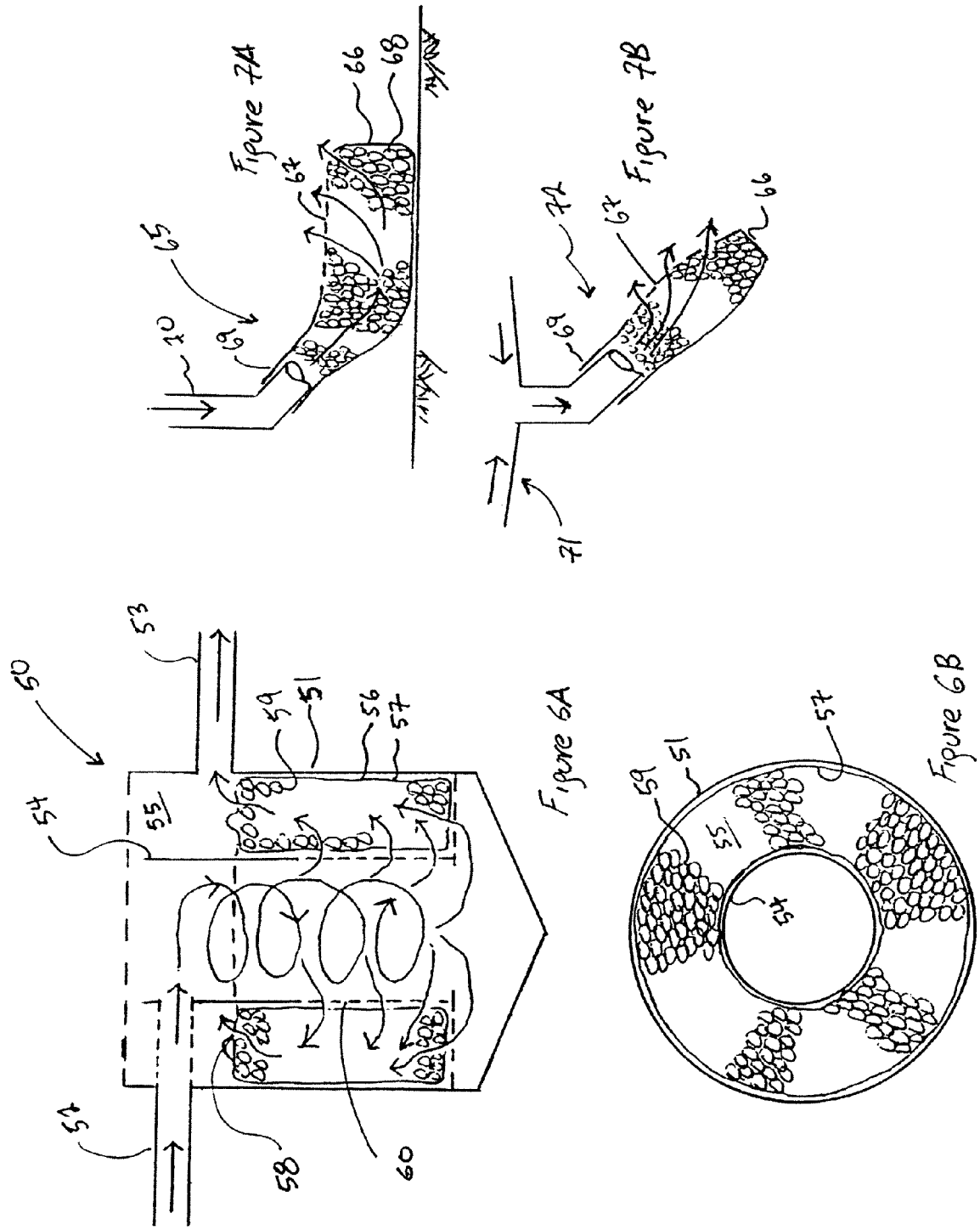

CLARIFICATION AND SORPTIVE-FILTRATION SYSTEM FOR THE CAPTURE OF CONSTITUENTS AND PARTICULATE MATTER IN LIQUIDS AND GASES

This application is a continuation of U.S. application Ser. No. 11/218,677, filed on Sep. 2, 2005, now U.S. Pat. No. 7,341,661, which application is a continuation-in-part of Ser. No. 10/842,328, filed May 10, 2004, which is a divisional of Ser. No. 09/916,171, filed on Jul. 26, 2001, now U.S. Pat. No. 6,767,160, which is a divisional application of Ser. No. 09/714,366, filed on Nov. 16, 2000, now U.S. Pat. No. 6,468,942. U.S. application Ser. No. 11/218,677 is also a continuation-in-part of serial number PCT/US04/28342 filed Sep. 1, 2004 and this application incorporates by reference all above applications in their entirety.

BACKGROUND OF INVENTION

1. Technical Field

The present invention relates to the removal of cationic, anionic, complexed or particulate contaminants from liquids and gases. In particular, certain embodiments relate to particle clarification and sorptive-filtration by media which removes chemical constituents and particulates in a liquid or gas passed through the media.

2. Background Art

An area of increasing concern in the environmental sciences and engineering, particularly process control is the treatment or control of species that represent an environmental, ecological, human or process concern. Common examples include metal species and phases such as for metal elements Cd, Cu, Zn, Ni, Pb, As, Ag, V, and Cr, as well as non-metal species and phases such as for constituents phosphorus and nitrogen species which become water borne and are carried by urban and rural rainfall-runoff and snow-snowmelt (herein identified as "runoff") to drainage systems (herein identified as "drainage") receiving waters, water supplies, and to natural and anthropogenic terrestrial interfaces such as soils, the subsurface or earthen deposits. As used herein, ions or complexes being "water borne" means being transported in water in any manner, whether the ionic or complexed form is in solution, as a precipitate material, or is transported by water through a particulate bond or physical-chemical or biological attachment to a particle, in the form of a surface complex or a colloidal bond, or carried by the advective or diffusive transfer of water. Common manners in which such species and phases become water borne is through leaching, dissolution or particulate-bound entrainment by runoff from surfaces of the built or constructed environment, for example paved surfaces, or from human activities such as industry, manufacturing and agriculture. These species and phases are typically deposited on urban surfaces such as constructed surface, open surfaces, soil surfaces, and paved surfaces though vehicle exhaust, fluid leakage, vehicular wear, pavement degradation, particulate deposition, litter, illicit discharges, downspout discharges and pavement maintenance. These species and phases are typically deposited on earthen or soil surfaces through agricultural processes such as fertilization, pesticide application, insecticide application, and soil amending and land-disturbing practices such as earthwork, grading, cut/fill excavation and surficial as well as deep soil modifications. Subsequent hydrologic precipitation results in the mass transfer of these species or phases either in ionic, complexed or particulate-bound forms and transports these species and phases in surface or subsurface flows by advective, diffusive, gravitational, chemical or electromagnetic gradients.

The particulate and colloidal matter (herein identified as "particulates) itself can be deleterious, representing an environmental, ecological, human or process concern that requires control. In this application, "particulate-bound" means any bond, precipitate or complex associated with particulate material that ranges in size from colloidal (<1 µm) to suspended (1-~25 µm) to settleable (~25-~75 µm) to sediment (~75 to 4750 µm) larger gross solids or debris (>75 µm) or floatable material. While the size limits of each class of particulate matter are approximate because of properties such as specific gravity and geometry, taken in total these classes represent the entire size gradation found in surface runoff, drainage or subsurface flow. The ionic fractions can be quite variable. For example, metals such as Zn in certain source area urban watershed locations under conditions of acid rain can be greater than 80% dissolved ($f_d$=0.8); while in other watershed or in lower locations of the same watershed, the $f_d$ for Zn can be as low as 0.2. The remaining percentage is largely particulate-bound but may be a complexed aqueous species. However, in the simplest two-phase model if the dissolved fraction is 0.8 then the particulate fraction for Zn is 0.2. This 0.2 will then distribute across the particulate size gradation as a function particle indices such as surface charge, surface area, mass and number gradation, composition of particle and contact time.

It is desirable to intercept the runoff or drainage and remove these species, phases or particulates prior to allowing the water to continue to drainage areas, water supply areas, through the subsurface or in a down-gradient transport to a sea or ocean. One method of separating the water borne species whether in dissolved ionic, complexed, precipitate or particulate-bound forms is to pass the water through a media or medium that functions to provide a range of mechanisms from surface complexation, ion exchange, adsorption, absorption or precipitation (herein collectively; identified as "sorption") and also provides a range of mechanisms such as interception, sedimentation, impaction, straining, adhesion or physical-chemical-biological sorption of particulate matter (herein collectively identified as "filtration"). Such a media or medium is identified as providing sorptive-filtration.

One of the most common media for removing particulate bound metals from water is sand and sometimes perlite. However, sand has very little capacity for removal of dissolved or complexed species and therefore, is generally not considered effective in removing these species. A common media used for drinking water is granular activated carbon (GAC) and has long used as a media for removing dissolved organic species and also been used for species such as metals. However, for many cationic species GAC has relatively little sorptive capacity and rapid breakthrough occurs and thus, sorbed metals must frequently be removed or the GAC "recharged." Also, GAC has low compressive strength and cannot support vertical, lateral or shear loads. Any application which places such loads on the GAC material may cause crushing, significant deformation and a greatly reduce sorptive-filtration capacity and impair physical characteristics of the GAC and the sorptive-filtration system. Similarly earthen materials such as natural perlite or modified perlite have been used for filtration and/or sorption. However perlite itself also has lower strength and loading characteristics and lower sorptive capacity for many metals and non-metals such as phosphorus.

A much more recently developed sorbent media is iron oxide coated sand (IOCS). IOCS is formed by coating silica sand with a thin layer of iron oxide and it has been shown to be an effective sorbent media for cationic species such as metals or anionic species such as phosphorus, in part dependent on the pH and point of zero charge (pzc) of the surface coating. Iron oxides and hydroxides possess little or no permanent surface charge, but will take on a positive or negative surface charge in the presence of protons or hydroxyl ions. In other words, depending on the pH of the solution in which the iron oxide is place, the iron oxide may take on a net positive or negative charge. A substance which exhibits a net positive or negative charge depending on the pH level may be referred to as an "amphoteric" substance, Iron oxide typically has a smaller net charge (either positive or negative) in a pH range of approximately 7 to 8. When the pH rises above approximately 8, the iron oxide becomes more negatively charged. Thus, positively charged cations will engage in a sorption reaction with the iron oxide surface or suspended/colloidal particulates with or without bound metal or non-metal species and borne by water passing over the negatively charged iron oxide will tend to bond to the iron oxide and be filtered from the water. Conversely, if the pH falls below approximately 7, the iron oxide becomes positively charged and is less likely to bond with cationic species, but will bond with anionic species or complexes. The pH at which the net surface charge of a particle is zero is denominated the point of zero charge or "pzc".

One major disadvantage of IOCS, coated on an unprepared substrate surface is that the oxide coating is not sufficiently durable. For example, the comparatively smooth surface of sand particles tends to result in the oxide coating flaking off. Attempts to avoid this flaking have led to time consuming sand preparation efforts such as cleaning the sand of organics or weak surface coatings and applying a scratch surface to the sand before applying the oxide coating. However, even with these preparation efforts, IOCS still exhibits flaking and thus a reduction in oxide coating durability. The smooth surface of the sand is also disadvantageous from the standpoint of providing a comparatively low specific surface area (SSA) for bonding. The specific surface area of a material is generally defined as the surface area per unit mass with the typical unit being $m^2/gm$. As used herein, specific surface area means the total area on the surface of the material in addition to any available porous internal surface area (such as for the GAC discussed above). The greater the surface area of the substrate, the greater the surface area of oxide coating that will be exposed to water borne metals. Thus, it is desirable to provide a substrate with a relatively large SSA not withstanding other design constraints. For example the SSA of rounded silica sand is approximately 0.05 to 0.1 $m^2/gm$.

Another problem found with IOCS is the tendency of the oxide coating to crystallize. When the coating crystallizes, the crystals set up a morphology which does not result in the highest surface area of the coating. The surface area of the coating is much more optimal if the oxide molecules are randomly distributed in a non-lattice or "amorphous" fashion. For example, the SSA of IOCS may approach 85 $m^2/gm$ if a method of sufficiently inhibiting crystallization could be provided.

BRIEF DESCRIPTION OF THE DRAWINGS

FIGS. 6A and 6B are different views of an alternative filter system having a containment of media in a filter housing.

FIGS. 7A and 7B are filter systems having media containments positioned on down spout drains or similar types of drains.

DETAILED DESCRIPTION OF THE INVENTION

Figure 1:
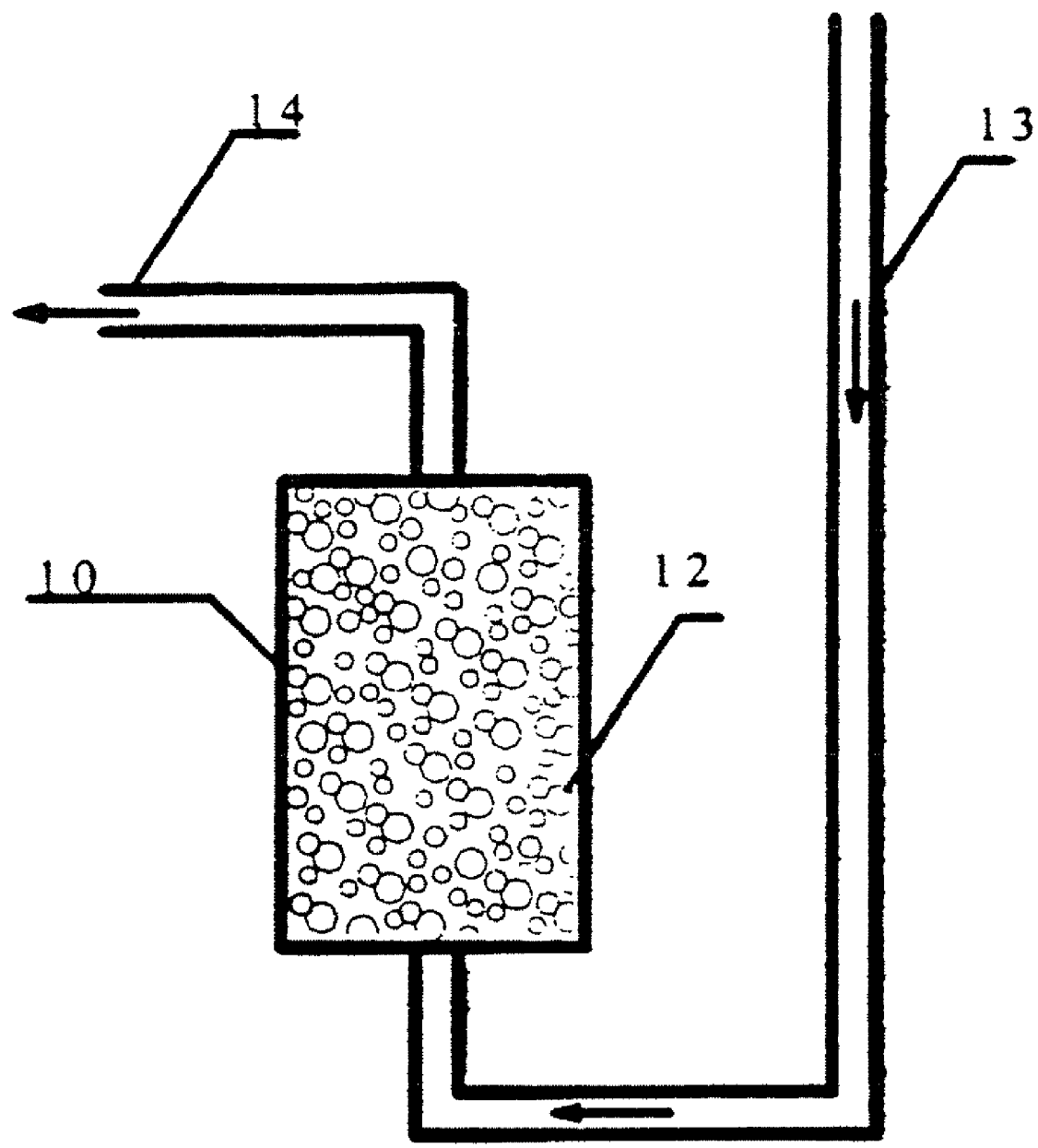
FIG. 1 is a diagram of an upflow filter.

The filtering media or medium of the present invention generally comprises a sorptive-filtration media or medium. The term "filter media" or "media" means any substrate used for filtration whether in the form of granular particles, a fixed porous matrix, or any other form which may accomplish the objects described in this application. The media maybe sorptive in that it may include a substrate with an amphoteric substance or compound applied to, coated upon, or bonded to the substrate to produce a high specific surface area media capable of sorbing (i.e. the physico-chemical capture of) dissolved, ionic, complexed or particulate-bound contaminants or particles. The media may also have a filtration characteristic which relies on the physical (or physical-chemical) capture of contaminants which are larger than the specific openings in the pore spaces in the media or medium.

In one embodiment, the liquid (or gas) to be treated will be passed through a granular or a fixed medium incorporated as part of a unit operation and process (UOP) or as a separate UOP that forms part of a treatment or modification system for liquids (or gases). In particular, certain embodiments relate to removal of metal species and phosphorus species either in aqueous ionic forms, as aqueous complexes, as particulate-bound or colloidal-bound species; and as precipitates.

In another general embodiment, the invention includes a granular substrate with an amphoteric substance applied thereto in the presence of a crystal inhibiting agent (for select substances or combination of amphoteric substances the explicit or additional use of a crystal inhibiting agent is not required). The granular substrate could be sand or any other granular substrate such as crushed limestone, crushed concrete, or other granular substrates such as polymeric beads (or other shapes), natural substances, or modified substances such as perlite. In another general embodiment, the present invention includes all substrates having a specific surface area of 0.1 $m^2/gm$ or greater and having an amphoteric substance applied to the substrate. In these latter embodiments with a substrate having an SSA of greater than 0.1 $m^2/gm$, the substrate could include a wide variety of materials such as precast cementitious porous pavement (CPP) discussed herein (one form of which having an SSA of 5-10 $m^2/gm$), wood chips, recycled concrete chips, recycled concrete pavement rubble, fired clay or silt material, cemented clays or silts, perlite, zeolites, natural aggregates, synthetic aggregates, polymeric compounds, granular activated carbon (one form of which having an SSA of 600-1300 $m^2/gm$) etc.

The amphoteric substance of the present invention is intended to include any substance or compound having amphoteric properties or which exhibit amphoteric properties when in an aqueous environment. Certain embodiments of the amphoteric substance include compounds such as oxides of iron, manganese, aluminum, or silicon. Certain non-limiting examples of amphoteric substances, e.g. for iron, include the more common mineral forms identified in table 1, or the various mineral forms of manganese, aluminum, silicon or combinations thereof of these four. Non-limiting examples of manganese forms may include Pyrolusite, Ramsdellite, Nsutite, Hollandite, Cryptomelane, Coronadite, Romanechite, Todorokite, Birnessite, Vernadite, Rancieite, Buserite, Lithiophorite, Manganite, Hausmannite. Aluminum is typically listed as classes of aluminum oxides, hydroxides and orthohydroxides (although there are many polymorphs for aluminum). Some common mineral forms are gibbsite, bayerite, boehmite, and diaspore. Some forms of silicon are silica, quartz, cristobalite, tridymite, and opal.

In some embodiments, an amphoteric solution is formed by dissolving a salt of iron, manganese, aluminum, or silicon (or any combination of these) in a solute. The substrate is then exposed to this solution by immersing, spraying, or other application. The liquid is volatized in a drying process to leave behind a metal oxide bonded to the substrate. Typically any remaining component of the metal salt (e.g., nitrate, sulfate, or chloride) is readily washed off the substrate leaving predominantly the metal oxide. Although in many embodiments the amphoteric substance will be at least one oxide of either Al, Mn, Fe, or Si, the amphoteric substance may include other combinations of forms of Al, Mn, Fe, or Si which exhibit similar amphoteric properties when applied to the substrate, regardless of the manner of application.

In regards to iron oxide compounds, there are at least 13 iron oxide minerals, of which there are 8 major iron oxides. These iron oxides differ in composition, the valence state of Fe and in crystalline structure. However, all iron oxides contain Fe and O or OH. Table 1 summarizes the major iron oxides with selected characteristics.

or ferrous ions. To inhibit such transformation to the more crystalline compounds, inhibiting agents such as silica ($SiO_2$), silica fume or silica gel, inorganic compounds such as phosphates, polymeric compounds whether naturally occurring (e.g. natural organic matter in soil) or synthetic (e.g. polyethylene), sodium hydroxide, oils, grease, or any other substance which inhibits crystallization, may be introduced in certain embodiments of the process for synthesizing ferrihydrite or applying the iron oxide coating. In certain embodiments where sand is the substrate, a highly acidic compound, such as ferric nitrate or ferric chloride (used to form the amphoteric compound as described below) may dissolve silica off the sand substrate, thereby producing an inhibiting agent. Because so many substances may act as inhibiting agents, it is possible that certain impurities in the materials selected (such as grease or oil in a sand substrate) can be engineered to act as a sufficient inhibiting agent without the addition of further inhibiting agents. While typically advantageous to use an inhibiting compound with iron oxides, it may not be necessary when the amphoteric compound is an oxide of manganese, aluminum, or silicon. However, the use of an inhibiting agent with the latter compounds is within the scope of the present invention.

Two known methods for producing ferrihydrite follow. The first method involves preheating 2000 mL of DI water to 75° C. in an oven and then withdrawing the water and adding 20 g of unhydrolyzed crystals of $Fe(NO_3)_3.9H_2O$. The solution is stirred rapidly and reheated at 75° C. for 10 to 12 minutes. The formation of iron hydroxy polymers will change the solution from a dull gold color to dark reddish brown. The solution is then dialyzed for three days to produce approxi-

TABLE 1

Selected properties and attributes of major iron oxide minerals.

| Mineral Name | Formula | Structural system | Density ($g/cm^3$) | SSA ($m^2/g$) | Color |
| --- | --- | --- | --- | --- | --- |
| Hematite | $\alpha$-$Fe_2O_3$ | Trigonal | 5.26 | 20-30 | blood red |
| Maghemite | $\gamma$-$Fe_2O_3$ | Cubic or tetragonal | 4.87 | 80-130 | Chocolate |
| Magnetite | $Fe_3O_4$ | Cubic | 5.18 | ~4 | black |
| Goethite | $\alpha$-FeOOH | Orthorhombic | 4.26 | 20-40 | mustard |
| Lepidocrocite | $\gamma$-FeOOH | Orthorhombic | 4.09 | 70-80 | Orange-brown |
| Ferrihydrite[1] | $5Fe_2O_3 \cdot 9H_2O$[2] | Trigonal | 3.96 | 180-300 | deep brown |
| Feroxyhyte | $\delta'$-FeOOH | Hexagonal | 4.20 | 190-210 | Brown |
| Akaganeite | $\beta$-FeOOH | Tetragonal | 3.56 | ~30 | dark mustard |

[1] ferrihydrite & feroxyhyte have the only amorphous or poorly-crystalline structures low SSA from $Fe(NO_3)_3 9H_2O$ hydrolysis, high SSA from $Fe^{3+}$ precipitation with KOH
[2] other formulas include: $Fe_5HO_8 \cdot 4H_2O$ and $Fe_6(O_4H_3)_3$ point of zero charge (pzc) for all minerals shown is between pH 7-8
$\alpha$: hexagonal close packed (more stable than $\gamma$)
$\beta$: goethite polymorph in presence of high $Cl^-$ levels
$\gamma$: cubic close packed
$\delta'$: poorly-ordered ferromagnetic form of FeOOH From Table 1 it can be seen that the more amorphous ferrihydrite or feroxyhyte are the forms of iron oxide with the highest SSA. If these forms are coated onto silica sand, their higher SSA, as compared to say the more crystalline hematite, will create a more preferable sorbent media. For this reason, a one embodiment of the amphoteric compound focuses on the use of these forms, specifically ferrihydrite. Those skilled in the art will understand that ferrihydrite is not produced in isolation, but is typically formed in a solution having various other iron oxide compounds. The ferrihydrite may transform into other, more crystalline iron oxide compounds (such as hematite or goethite) depending on factors such as temperature, pH, and whether the iron source is ferric mately 5 g of ferrihydrite. This procedure produces a ferrihydrite of lower SSA, in the range of 180 to 200 $m^2/g$.

A second method involves dissolution of 40 g of $Fe(NO_3)_3.9H_2O$ in 500 mL of DI water and addition of approximately 330 mL of 1M KOH until the pH is 7 to 8 while stirring the solution. This procedure produces a ferrihydrite of higher SSA, in the range of 200 to 300 $m^2/g$. The solution is then centrifuged and dialyzed to produce approximately 10 g of ferrihydrite. While both of these procedures work well for a small mass of ferrihydrite (i.e. 10 g) in a laboratory environment, they are not easily adapted to be economically feasible at production or field scale levels that require tons of such a coating. Rather, the above methods would require design and construction of a plant-sized process to produce multiple tons of ferrihydrite.

Another embodiment of the present invention includes another, more economical method for producing sufficient quantities of ferrihydrite. In this method, the source of ferric ions is either $Fe(NO_3)_3 \cdot 9H_2O$, (ferric nitrate (FN)) or $FeCl_3$, (ferric chloride (FC)). Both FN and FC are available as reagent-grade salts or available commercially in larger quantities as bulk solutions. FC has the additional advantage of being more economical and being a by-product of pickling waste. When FN or FC are dissolved in potable water to produce an approximately 1M to approximately 3M solution, the resulting iron oxides in the solution will typically be approximately 50% ferrihydrite and 50% other iron oxides.

One substrate to which a coating of amphoteric compound may be adhered is sand. Sand typically has a comparatively low SSA of about 0.05 to about 0.10 $m^2$/gm. Moreover, this low SSA is indicative of a relatively smooth surface to which iron oxide coatings will have difficulty adhering. As discussed above, without some agent to inhibit crystallization of the iron oxide coating, the SSA may remain in the range of 1 to 5 $m^2$/gm. Two examples of producing a sand substrate filtration media with a markedly improved SSA (about 5-20 $m^2$/gm) by subjecting conventional sand to a multi-step process are as follows.

In the first example, the sand was first cleaned and tumbled in acidic solution (of a pH<2), rinsed with DI water, and then cleaned and tumbled in a very dilute basic solution before a final rinse is made. Second, to promote bonding, an initial scratch coat applied by immersing the sand in an approximately 1M FN solution. The sand was then heat at about 100 degrees C. until this coating was dry and then the sand was disaggregated and rinsed in DI water to remove any loose coating. After this rinsing, the sand was reheated until dry and then cooled. Third, the sand was immersed in another solution of 1.6 M FN. In this solution, 1,000 ppm $SiO_2$ was added (in the range of 1% of the aqueous volume) to help inhibit the transformation of ferrihydrite to hematite or possibly to goethite. Fourth, the sand was again dried with drying times minimized in order not to promote the transformation to hematite due to dehydration. However, drying of the sand at high temperatures could also lead to thermal transformation of ferrihydrite to hematite. It was determined that drying could take place at an acceptably fast rate at 100° C. if an inhibitor such as $SiO_2$ was used to prevent crystalline bonds from forming. Once drying was complete, the sand was allowed to cool and the coated media was disaggregated. As a final step, the media was pH conditioned to a neutral pH by passing DI water at a pH of 8 to 9 (raised with NaOH or a similar base) through the media until the pH of the effluent was between 7.5 and 8, above the point of zero charge for iron oxides. This also removed any loose iron coating. It is noted that the above mentioned scratch coating is necessary because the granular substrate was sand which has a relatively smooth surface. However, other granular substrates such as crushed limestone have a sufficiently rough surface that a scratch coat is not required.

The second example is provided by a larger-scale field production. The above method is scaled up by using a larger gasoline-powered concrete mixer and a gas-fired heater. A 3.0 M ferric chloride (FC) solution containing 1000 ppm silica solution was prepared in sufficient volume such that the sand could be completely immersed. Thereafter, heat was applied via the gas-fired heater to evaporate the liquid and attach the iron to the sand surface. Typically greater efforts must be made to insure dryness of the FC treated sand as opposed to the FN treated sand since FC is significantly more hydroscopic than FN. This method proved feasible to produce the required 9 tons of OCS necessary for a related experiment.

For each batch, approximately 90 pounds of filter sand was placed in the concrete mixer with an excess of ferric chloride solution. The amount of ferric chloride solution put into the mixture was enough to just cover the filter sand. The mixture was stirred vigorously and heat applied by the a gas-fired heater. The gas-fired heater was directed into the mouth of the concrete mixer. The slurry was continuously stirred by the concrete mixture until the sand was completely dry. Typical drying time for each batch was 3 hours.

Once dry, the sand was poured from the concrete mixer into a backhoe bucket and placed in a tandem dump truck for cooling. In preparation for pH neutralization, complete drying of the sand was essential to ensure the iron coating would not be removed by the sodium hydroxide in the pH neutralization process. If the sand is not completely dry, the iron coating washes off easily when put into the NaOH solution.

Since the sand was placed in a tandem dump truck for cooling, it decided to neutralize the entire truckload at once to reduced handling of the OCS. The dump truck full of OCS was parked facing down a slope and a solution (of approximately 10 lbs. of NaOH per 55 gallons of potable water) was poured into the truck bed on top of the OCS. The idea was to create a bathtub effect to neutralize the sand. The truck bed did leak but the level of the solution was kept above the depth of the sand with continual addition of NaOH solution. Leakage of the truck bed proved beneficial due to the continual addition of new solution to replace loss. The new solution was more capable of neutralizing the OCS while the used solution was removed from the system. The pH was checked with a pH probe at several depths in the truck bed to ensure complete neutralization. Approximately 10 tons of OCS was produced, the largest known quantity of such material. In the above process, the inhibiting agents were formed by the impurities found in the mixer, the gas-fired heater, NaOH and the construction process in the field to such a degree that it was not necessary to add additional silica as an inhibiting agent.

Another embodiment deals with substrates having a specific gravity of less than 1.0. There are a large number of likely substrates having an specific gravity of less than 1.0. One family of such substrates is wood, with pine having by way of example a specific gravity of about 0.35. Another family of such substrates is polymeric compounds. Polymeric compounds may include light weight materials such as foam packing pellets (e.g., polystyrene), which would form a granular media having a specific gravity of approximately 0.2. Polymeric compounds could also include heavier polymers having a specific gravity of up to 0.97. Polymeric compounds could also include polymer-type materials which have similar weight, flexibility, and long molecular chains. Of the polymer family, it has been found that polyethylene (PE) or polypropylene (PP) have many characteristics making them suitable substrates for the present invention. PE and PP have a specific gravity of about 0.9. It is believed PE, PP, and other similar polymeric compounds are particularly useful when in the form of polymeric floating media filter beads. Normally, polymer beads will have a specific gravity ranging between approximately 0.50 and 0.95. One simple example of a "filter" or "clarifier" using floating polyethylene beads can be seen in FIG. 1. In the embodiment of FIG. 1, the filter is a cylindrical geometry upflow filter, but the filter could utilize many geometries and flow directions depending on constraints such as media type, coating, specific gravity and design intentions. Filters using floating polyethylene beads are usually upflow filters such as seen in FIG. 1, but can be downflow filters and have a variety of geometric shapes. In FIG. 1, the upflow filter 10 is filled with floating polymeric beads 12. An influent flow 13 flows into filter 10, through beads 12 (where it has pollution constituents adsorbed and filtered), and exits as effluent 14. While not explicitly shown in FIG. 1, the upflow filter 10 could utilize any number of methods well known in the art for backwashing the beads. Upflow filters have the advantages of being easily backwashed to prevent clogging and are less likely to hydraulically "short-circuited" (i.e. water cutting an uninterrupted fluid path through the beads and not having to flow around the individual beads). It has been found that allowing a layer of sediment to form at the base of the filter media may actually enhance filtration as long as the layer does not become so thick that the layer significantly inhibits design flows. The filter media would be backwashed at the point design flows were significantly inhibited. It is also very practical to direct water through an upflow or downflow filter when the water is being drained from a elevated grade (such as a highway overpass or an elevated interstate). A media bed formed of a granular material such as sand, polymer beads, or other granular materials will have a given porosity. In one embodiment, this porosity will be between about 0.1 and about 0.6 while in another embodiment the porosity will be between about 0.2 and about 0.5. However, the present invention includes larger porosity ranges and any sub-range between about 0.1 and about 0.6.

The present invention encompasses virtually any filtration system where a contaminant containing aqueous stream is passed through media having some type of amphoteric coating applied thereto. In one embodiment, the contaminant containing aqueous stream is formed substantially of urban runoff. The sources of "urban runoff" as used herein means an aqueous stream from diffuse sources such as rainfall runoff or snow melt and point source overflows such as sewer overflows, wherein the stream in directed through an open drainage system (as opposed to a closed drainage system such as a sanitary sewer). In one embodiment, the contaminants are phosphorus and/or metal ions, complexes or particulates and the media is coated with an oxide of aluminum, iron, manganese, or silicon. The contaminants could be negatively or positively charged ions or complexes or particles. In another embodiment, the media is coated through a process where a crystal inhibiting compound is added. Preferably, the crystal inhibiting compound raise the SSA of the coated substrate to at least 5 or 10 $m^2/g$ and more preferably to at least 20 $m^2/g$.

As used herein, "coating" or "coated onto" means a film formed on the substrate. The film need not cover the entire substrate, but where it does cover the substrate, the coating is "cohesive" and "adhesive". This is distinguished from a series of discrete particles spread on a surface, but not being cohesive. Normally, a coating will cover a significant part of the substrate. If the substrate has internal surface area, the amphoteric substance will form a film on the internal surface area of the media substrate. This film also need not cover the entire internal surface area of the substrate, but where it does cover the internals surface area, the film is cohesive and adhesive.

One preferred method of applying the amphoteric compound to the polyethylene is similar to that used to apply iron oxide to sand and is as follows. A 0.5 to 5 molar solution of FN or FC (preferably about 1.6M) is prepared by dissolving the FC or FN in water. The polyethylene beads are placed in the solution and continuously stirred. The polyethylene should remain in the solution a sufficient time for the entire surface area of the polyethylene to become coated with iron oxide. An hour should be sufficient period of time under most circumstances. The water is then evaporated from the solution containing the polyethylene at a temperature of approximately 90° C.-95° C. The drying may take place at lower temperatures, but will unnecessarily slow the drying process. Drying at higher temperatures is possible, but may be undesirable from the standpoint of the polyethylene becoming excessively plastic at temperatures above 95° C. and crystallization of the iron oxide becoming more prevalent at higher temperatures.

One favorable characteristic of employing polyethylene as a substrate is that polyethylene has an inherent tendency to inhibit the crystallization of the iron oxide. This is believed to occur by way of polyethylene molecules detaching from the substrate surface and becoming lodged in the iron oxide molecules depositing on the substrate surface. As alluded to above, this disruption of a uniform iron oxide lattice tends to create a favorable, amorphous (thus high specific surface area) coating of iron oxide. In addition to taking advantage of the natural crystallization inhibiting character of polyethylene, when using an iron oxide as the amphoteric compound, it may also be desirable to further add an inhibitor such as the 1000 ppm $SiO_2$ solution discussed above. The amount of $SiO_2$ solution may vary, but an amount equal to 1% or less of the aqueous volume is normally considered sufficient. If manganese oxide is the amphoteric compound, it usually may not be necessary to add an inhibiting agent to achieve an acceptable SSA. Significantly, it has been found that polymeric beads having a specific gravity of about 0.9 maintain a specific gravity of less than 1 (and therefore float) even after being coated. The coating generally raises the bead's specific gravity to about 0.95.

While the above procedure described applying an amphoteric compound to polyethylene beads, it will be understood that the procedure could be carried out numerous other polymeric materials. For example, an amphoteric compound could be applied to simple packing material, cheap polymeric woven and non-woven material, geosynthetics, polystryenes and expanded foams as well. The foams have to be dried at a lower temperature so they do not melt, so for the case of expanded foams or heat sensitive polymerics, manganese coatings are preferable to iron coatings (which require higher temperatures to dry).

As mentioned above, another family of amphoteric substances are formed from manganese, aluminum or silicon. There are a whole series of manganese oxide minerals that can be produced that have useful characteristics as media coatings for the treatment of storm water and other waste streams containing dissolved ionic species, complexed species and particulate-bound species such as heavy metals. However, two manganese oxides groups comprise embodiments for use with the present invention because their combination of negative surface charge (measured as units of charge per surface area) at nearly all environmental pH values and because of their high specific surface area. This results in a coated media surface with a high surface density of negatively charged sites for adsorption of heavy metals. These two manganese oxides are birnessite (whose structure is not completely understood, but is believed to be in part a layered ($MnO_6$) structure and cryptomelane, ($\alpha$-$MnO_2$) which is a tunnel structure. Both are different manganese oxide minerals having different structures. Although not as critical as with iron oxides, some inhibition of crystallization may be helpful to produce poorly crystalline structures and higher surface area.

Figure 2:
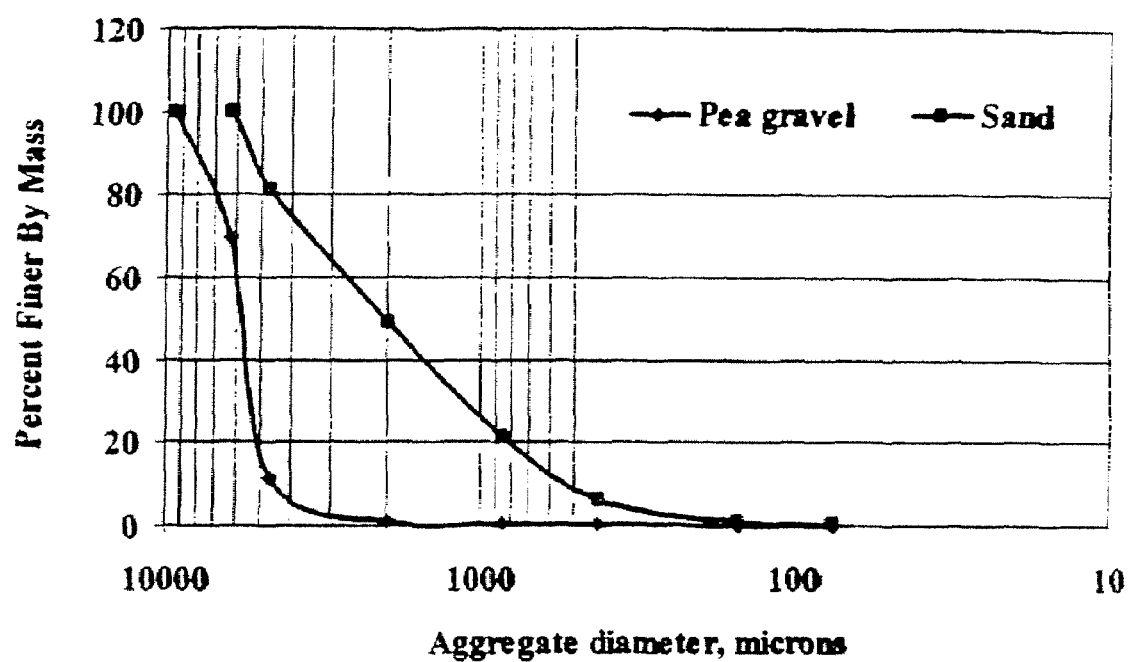
FIG. 2 is a chart of surface charge versus pH for certain amphoteric compounds.

The point of zero charge (pzc) of manganese oxides and their surface charge density may in some cases provide advantages of manganese oxide coatings over iron oxide coatings in the adsorption of heavy metals. Iron oxide coatings only have a negative charge on their surface when the pH of the solution surrounding the media is greater than the pzc of the coating. For pure iron oxides crystalline minerals, this ranges from 7 to 8 depending on the mineral form of iron oxide (i.e. goethite, hematite, etc.) and is a comparatively narrow range. For silica-inhibited ferrihydrite this pzc can be between pH values of 5.5 to 7.5. For manganese oxides the pzc values are much lower. The pzc occurs at a pH of less than 5. Reported values of the pure mineral forms are in the range of 2 to 3. FIG. 2 illustrates the pzc for the manganese oxides Birnessite and Cryptomelane and the iron oxide Goethite. Thus, for manganese oxide coated media there is a strong negative charge at typical environmental pH levels of 6 to 8. This also means that pH conditioning such as rinsing with DI water is usually not necessary for manganese oxide coated substrates.

Those skilled in the art will recognize there are numerous methods of producing manganese oxides, aluminum oxides or silicon oxides for use in the present invention. The following two methods disclose example methods of the present invention for producing both birnessite and crypotmelane.

Birnessite Coating Method (BCM).

The disclosed binessite coating method uses a wet oxidation procedure to precipitate the colloid of birnessite on the media surface. In other words, a solution containing manganese was oxidized to create a $MnO_x$ form. Two moles of concentrated hydrochloric acid (37.5%) were added dropwise and continuously to a boiling solution of 0.5-M potassium permanganate in 1 liter of water, to which 0.5 liters of media was added, immersed and vigorously stirred. The media actually used included plastic beads, sand, GAC, concrete blocks and concrete rubble. However, any other suitable media (wood, etc.) could also be used. After boiling for 10 minutes further, the media was washed with water and dried at room temperature overnight. Under lab conditions, a reasonably pure form of birnessite can be produced (>80% pure). This produced a coating having a surface area of 70-90 $m^2/g$ (i.e. surface area of coat as applied to the substrate) with a pzc at a pH near 3. At environmental pH values the surface charge density is very negative (−10 to −20 micromoles/$m^2$). This coating has an approximate mean of about 1200 micromoles of negative charge per gram of coating.

Cryptomelane Coating Method (CCM).

The Cryptomelane coating method uses a wet oxidation procedure to precipitate the colloid of cryptomelane on the media surface. A solution of 0.35 moles $KMnO_4$ in 800 ml of water is heated to 60° C. and dropwise continuously added into a solution 0.5 moles of $MnSO_4$ in one liter of 2M acetic acid. This solution was heated with 500 ml filtration media (such as acid washed polyethylene beads or any of the media types named above) to 80° C. while vigorously stirring. After stirring for 15 minutes, the media was removed, filtered, washed with water and allowed to dry at room temperature overnight. Under lab conditions a reasonably pure form of cryptomelane can be produced (>80% pure). This will produce a coating having a surface area of 200 to 270 $m^2/g$ (i.e. the surface area of the coating itself rather than applied to the substrate as above) with a pzc at a pH near 3 to 4. At environmental pH values the surface charge density is negative (−2 to −5 micromoles/$m^2$). This coating has an approximate mean of about 823 micromoles of negative charge per gram of coating.

It will be understood that one factor is the combination of specific surface area and surface charge. The difference between 1200 and 823 may be important when these coatings are applied consistently as with a chemical process operation.

It should be noted that at the upper end of environmental pH values, ferrihydrite (iron oxide) has a surface area of between 200 and 300 $m^2/g$ and a surface charge density of −0.1 to 1.0 micromoles/$m^2$. Silicate (a form of silica) contamination (addition of silica solution or natural silica in clay minerals), tends to prevent ferrihydrite from transforming to other iron oxides and thus tends to keep the pzc at a pH of around 5.5 to 7.5, as is typical for ferrihydrite. This coating has an approximate mean of about 113 micromoles of negative charge per gram of coating. However, the cost of an iron oxide coating is approximately 1/10 to 1/5 of a manganese coating. This cost does not include the cost of pH conditioning of the influent for iron oxides which can be significant for engineered systems.

Those skilled in the art will recognize that there is a variety of synthetic manganese oxide minerals as there is with iron oxide minerals. However, manganese oxides have not been as well studied as iron oxides. Technically, the term "birnessite" is used to refer to a group of manganese oxides for which the exact structures are still to a certain extent unknown. What is known is that these birnessite minerals are layered structures. Examples of birnessite minerals having a valence >+4 are vernadite, ranciete, buserite, and lithiophorite. Examples of birnessite minerals with a valence <+4 are magnetite and hausmannite. The other manganese oxides are tunnel structures. One of the more common is cryptomelane which forms a group of manganese oxides along with hollandite and coronadite (all having $\forall$-$MnO_2$ structures with a large foreign cation (K, Ba or Pb respectively) as part of the structure). Other minerals include ramsdellite ($\exists$-$MnO_2$), Nsutite ($\Delta$-$MnO_2$), romanechite ($MnO_6$) and todorokite. All of these minerals have negative surface charges and have SSA's that fall in the range of 50 to 280 $m^2/g$. Birnessite and cryptomelane are easy to produce and provide a good combination of negative surface charge and SSA for adsorption of cationic species (mainly heavy metals) when the pH is above the pzc (see FIG. 2). Naturally, it will be understood that altering the pH to above the pzc will facilitate removal of cationic species while altering the pH to below the pzc will allow the removal of anionic species such as nitrite ($NO_2^-$), nitrate ($NO_3^-$), or ($PO_4^-$).

It will be recognized the choice between iron oxide and manganese oxide present a typical design choice which will be governed by the particular engineering problem being addressed. Additionally, different concentrations of the metal oxides have been used in the solutions in which the substrate is immersed. The concentrations may range from 0.1 M to 3.0 M (or higher) solutions of the metal oxide. Nor is the invention limited to immersing the substrate in a metal oxide solution. Rather, the oxide solution could be an aerosol which is spayed onto the substrate. This technique works well in a reactor that fluidizes the media using a gas such as air. The oxide coating is injected as a fine spray onto the fluidized media. Once the media is coated, the temperature in the reactor would be raised to evaporate off the water and leave the oxide coating on the media. The media will continue to be fluidized throughout this process. The reactor can be as simple as an upflow column or a conical upflow reactor. A significant advantage of this technique is the savings created by the efficient use of the coating material.

Still further amphoteric compounds within the scope of the present invention are oxides of silicon, particularly as $SiO_2$ or "silica." Silica has a point of zero charge (pzc) at a pH ranging between about 2 to 4 depending upon the mineralogy and morphology of the silica. Thus, silica carries a strong negative charge at neutral pH. Specific surface areas of silica range between 10 and 300 $m^2/g$ and can be substantially greater depending on the particle size and morphology of the silica, reaching 1000 m²/g or higher. When silica is applied as a surface coating, the surface morphology is far less dense than for silica sand, whose surface has been significantly abraded. This is why a silica coating may have a very high specific surface area while silica sand has a very low specific surface area. A silica coating may be formed on various substrates in manners similar to those mentioned above in regards to oxides of aluminum, iron, and manganese. For example, the substrate could be immersed in an about 0.1 M to about 5.0 M solution of sodium silicate and then the substrate heated to dryness in order to form the silica coating. Naturally, many compounds other than sodium silicate could be employed, non-limiting examples being calcium silicate or pure silica. Additionally, higher specific surface areas may be achieved by techniques such as applying the silica solution to the media as an aerosol spray at elevated temperatures (e.g. 100° C. or higher).

Although not as common as iron oxides or manganese oxides, aluminum oxides may also be a viable oxide coating, especially on materials such as CPP. The chemistry of aluminum oxide indicates that it should be a viable material and the cost of this material is relatively low. Therefore, aluminum oxides (such as forms of $Al_2O_3$) or aluminum salts such as aluminum nitrate used to make amphoteric coatings or admixtures are intended to come within the scope of the present invention. Methods of preparation from aluminum salts are similar to iron discussed above.

The advantage of various alternative embodiments of the present invention will become apparent as those skilled in the art begin to practice the invention. For example, using cementitious porous pavement (CPP, discussed below) as the filter media or coating substrate allows a unique manner of avoiding the cost of pH conditioning of the influent. As is well known, cement is largely composed of alkalinity-producing substances and therefore is capable of pH elevation. One method is to coat only the bottom 80% of a CPP pavement block with iron, manganese, silicon or aluminum oxide or combination thereof. Then, as pavement runoff percolates down through the upper exposed cementitious material near the pavement surface, the pH of the percolating runoff will be elevated above the pzc of the oxide coating on the lower half of the CPP block and thus, the lower 80% of the CPP block form an efficient passive fixed sorption matrix.

Those skilled in the art will recognize many design issues which apply to the choice of substrates or filter media. As discussed above, the media may be many materials such as sand, polymeric media, clay, pumice, perlite or a fixed porous matrix such as cementitious porous pavement (CPP). Typically, the prior art is only concerned with making cementitious structures (e.g. pavement) as impervious to water as possible. However, one aspect of the present invention is creating a cementitious material which is quite porous either as a pavement material or as a media substrate. A wide range of size and gradation of material may be used as media and CPP blocks may be used in their block form or broken up to serve as a rubble or discrete media substrates. Issues such as contact time, contact surface area, filtration ability, porosity, stress-strain characteristics, pore characteristics, durability and hydraulic conductivity required will determine the choice of media substrate or rubble size. Any of the above described amphoteric coating preparation techniques may be applied to CPP material either as the material is being produced (described below) or after the material has been produced without a coating (in large or small blocks or as sections). If the CPP material is not produced with the amphoteric compound as an admixture (defined below), the block of material will be immersed in the amphoteric coating solution of choice and the solution is circulated through and around the CPP block. Because of contact time issues, one preferred method requires the intact CPP blocks to remain in the circulating Fe, Mn, Al or Si salt or oxide solution or combinations thereof for approximately 60 minutes before removing and elevated temperature and/or forced convective drying. Drying may also take place at room temperature for several days under still air conditions or for 24 hours when air is being blown by both sides of the block. Alternatively, the porous block could be sprayed with an oxide coating, allowed to dry at ambient or elevated temperature, and then be used. As used herein, a media having an amphoteric substance "applied" thereto includes coating (e.g., by spaying, soaking, or immersing) the media; having the amphoteric compound added while producing the media (e.g., as an admixture); or any other method of combining the amphoteric substance with the media. An "admixture" for the cementitious material (either CPP pavement or CPP as media) for the particular embodiments described herein may be defined as an amphoteric substance (for example a metal salt or metal oxide) other than the primary components (e.g., water, aggregate, cement) of cement-based materials such as concrete, where the amphoteric substance is added to the mix design before or during the mixing process of the primary components to produce desired modification to the properties and behavior of the CPP pavement or media. The admixture is distinguished from applying a layer, film or coating of an amphoteric substance in that application of such a layer, film or coating onto CPP pavement or media is carried out after some degree of hydration (curing) has occurred.

The CPP should be sufficiently porous to allow migration of water through the pore space, but retain sufficient strength to withstand vehicle wheel loads typically encountered by pavement systems that carry vehicular, animal or human traffic; for example road-side shoulders, roadways, parking areas, driveways or sidewalks. One measure of the ability of CPP to allow the migration of water is saturated hydraulic conductivity ($K_{sat}$) measured in cm/sec. In one embodiment, the hydraulic conductivity of the CPP could range between about 1.0 and about 0.0001 cm/sec or or in another embodiment between about 0.1 and 0.001 cm/sec or about 0.1 and 0.01 cm/sec. A still further embodiment has a hydraulic conductivity of about 0.01 cm/sec. While there may be situations where a very high hydraulic conductivity is desirable, this must be balance against concerns with sufficient structural strength and sufficient surface area contact time between the pavement and the fluid flowing through it to insure mass transfer and/or filtration by the pavement. The factors affecting the porosity of the CPP are the water to cement ratio, cement to aggregate ratio, whether and how much pressure is applied during curing, aggregate gradation, aggregate moisture content, and to a lesser degree, the amount of fine aggregate in the mix.

It will be understood that CCP having a hydraulic conductivity as described above will also have a certain total porosity. Total porosity (or simply "porosity") may be defined as the ratio of pore volume in a material to the total volume of the material. In one embodiment, the CCP described above will have a porosity of between approximately 0.1 and 0.6, while another embodiment has a porosity of between approximately 0.2 and approximately 0.4. Other embodiments may include any porosity sub-range between approximately 0.1 and approximately 0.7.

While there are many mixtures which would form the CPP of the present invention, three preferred mixtures are disclosed below in Table 1. The water cement ratio for each mix design is varied, ranging from 0.14 to 0.32. However, these water cement ratios were used in conjunction with steam curing as described below. Those skilled in the art will recognize that if steam curing is not used, the chosen water cement ratio would be higher, up to a water cement ratio of 1. Nevertheless, to maintain a hydraulic conductivity of between 1.0 and 0.0001 cm/sec., it is suggested that the water cement ratio be maintained below 1, although a water-cement ratio of greater than 1 is not excluded from the present invention. When CPP is used as a cast-in-place material (i.e. not steam cured and cured at ambient temperature and pressure) a water cement ratio of about 0.3 to about 0.4 with wetted aggregate would be one possible range.

Figure 3:
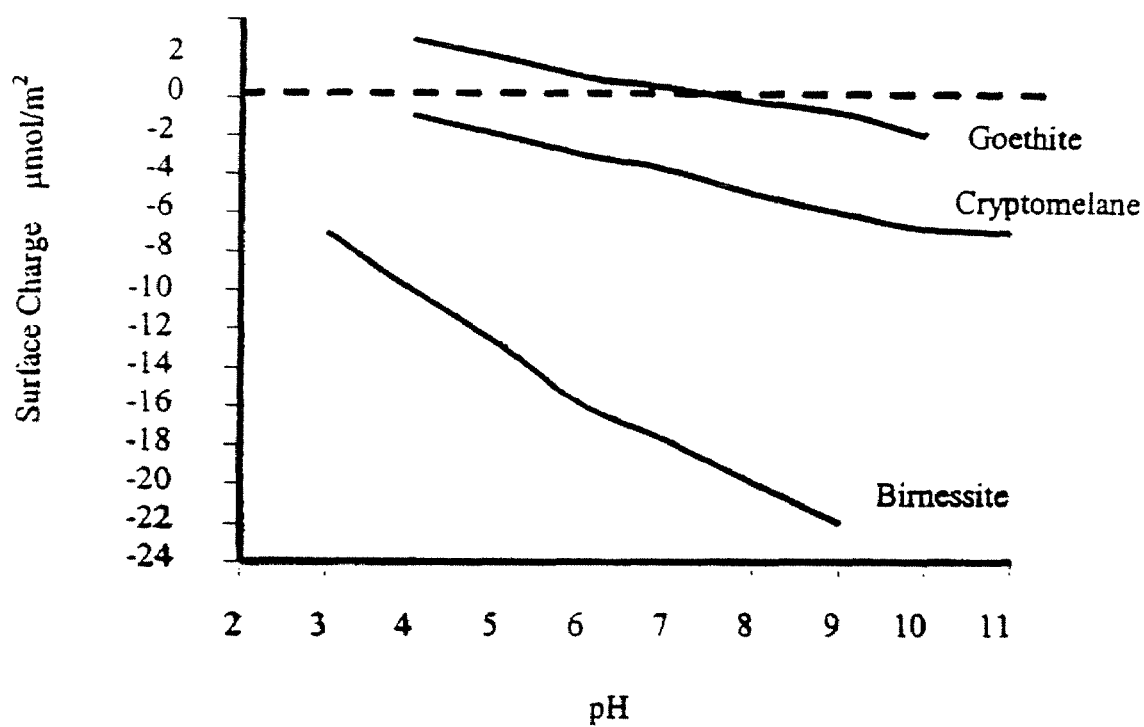
FIG. 3 is a chart of aggregate distribution.

Typically, the ratio of fine to course aggregates will be approximately 1 to 1. While this ratio could vary, an excessive amount of fines may tend to reduce porosity by filling passages in the cement structure and reducing the fine aggregate will result in larger pore openings. As an illustrative sample, the grain size distribution of the pea gravel and sand used in Batch 2 is presented in FIG. 3.

TABLE 2

Mix Designs for Porous Pavement Block

| Component | Batch 1 | Batch 2 | Batch 3 |
|---|---|---|---|
| Cement (Type II) | 109 kg (240 lbs) | 109 kg (240 lbs) | 109 kg (240 lbs) |
| Water | 15-20 kg | 20-25 kg | 30-35 kg |
| Coarse Sand | 472 kg (1040 lbs) | 381 kg (840 lbs) | 431 kg (950 lbs) |
| # 9 Gravel | 336 kg (740 lbs) | — | — |
| Pea | — | 381 kg (840 lbs) | 331 kg (730 lbs) |

— Indicates material not used in batch

The pavement resulting from the disclosed mixes was formed in various sizes of precast blocks, for example 24 inches×16 inches×4 inches thick. Naturally, this should by no means be considered an optimal size, but rather dimensioning of the blocks will depend on the application. In this example the blocks were subject to a conventional pressurized, steam curing process. The process incorporates a press using hydraulic compression to press the concrete mix into the block form. The hydraulic press was capable of exerting up to 35 kN (4 tons) of force on the wet cementitious mix in the form and the full 4 tons was applied in this experiment. Typically this pressure was applied for 1 to 4 minutes. Then the precast CPP blocks were steam cured (in a kiln with over 90% humidity) for four days to a week to promote adequate cement hydration and then the blocks were allowed to air dry for two days before transport. Longer steam curing up to 28 days will produce a higher strength material. Of course, there is a substantial amount of flexibility in the application of these various components in making CPP. For example, although the experiment above used 4 tons of force (or about 3000-lb/ft$^2$) applied for approximately 1-minute, both the force and duration of the loading can vary based on the application. Those skilled in the art will recognize many applications that may require less force or applications requiring more or less duration of the loading. Precast units and blocks can also be made on-site in molds at ambient pressure and temperature however material properties can be more variable than in a machine-controlled process.

From each porous pavement mix design, a block was sampled at random to determine the strength and infiltration capacity. From each block five cores are drilled using a 8 cm (3 in.) outside diameter diamond tipped coring bit. This yielded cores approximately 7 cm (2.75 in.) in diameter. The infiltration capacity of the porous pavement blocks was evaluated by the falling head permeability test for soils. Each core was wrapped with an impermeable membrane to determine hydraulic conductivity of the block. Flow was introduced from the bottom of the sample to ensure complete saturation. Two trials were taken for each core resulting in ten hydraulic conductivity values for each porous pavement mix design. As shown in Table 3, Batch 2 has the greatest hydraulic conductivity. Blocks tested later as full blocks had a full block $K_{sat}$ of approximately 0.01 cm/s.

Since the CPP on the roadway shoulder may be subject to occasional traffic loads (or many wheel loads in the case of parking areas), block strength is an essential consideration in the design. The unconfined compression strength of the blocks was evaluated. Two of the five cores from each mix design were tested to determine the unconfined compression strength. Since the length to diameter ratio of the cores was less than 1.8, the strength was reduced by applying the appropriate correction factor as designated in ASTM C-39. The resulting compression strengths of the three batches are seen in table 3.

TABLE 3

Measured Characteristic of the CPP Blocks

| Mix Design | Unit Weight | Average Hydraulic Conductivity (cm/sec) | Average Unconfined Compressive Strength |
|---|---|---|---|
| Batch 1 | 14.8 kN/m$^3$ (93.9 pcf) | 0.0091 | 37,500 kPa (5440 psi) |
| Batch 2 | 14.1 kN/m$^3$ (89.6 pcf) | 0.0098 | 27,700 kPa (4020 psi) |
| Batch 3 | 14.6 kN/m$^3$ (93.0 pcf) | 0.0090 | 33,600 (4880 psi) |

It is noted that these are only a few examples of measured characteristics of CPP blocks. In other blocks, it is envisioned using CPP where the hydraulic conductivity values are designed either higher or lower than the above values by adjusting the water to cement ratio or adjusting the fine to course aggregate ratio.

Previously described was a process of creating CPP blocks and then coating the blocks with an amphoteric compound by soaking the blocks in a solution containing the amphoteric compound or spraying on an amphoteric solution. However, the amphoteric compound could also be incorporated in the CPP as part of the process of mixing the cement/aggregate slurry; as an admixture. An example of this method follows.

In a shallow container of large surface area compared to depth (in the lab environment, shallow glass trays in the range of 12×16 inches were used), there is placed a solution of 0.1 to 5.0 molar solution of a metal salt or oxide or combinations of metal salts or oxides. The solution can be made by either method described above. To this solution, add a total of 1-kg of cement, and aggregate at the water/cement ratio and cement/aggregate ratio of choice to produce concrete of the strength and porosity desired. Those skilled in the art will understand that whatever volume of amphoteric solution is added should count toward the total water cement ratio. For example, using 1 kg of cement and a water cement ratio of 0.5, the adding of 0.25 kg of amphoteric solution will require an additional 0.25 kg of water to be added. The mixture is then dried (i.e. the cement is hydrated and the concrete mixture hardens) approximately 12 hours. It should be noted that at least part of the water in water-cement slurry is actually the solution of metal salt or oxide or combination thereof. In effect, the entire cementitious material is coated inside and outside with an amphoteric coating. The same method could be carried out for an iron oxide or silica coating but with the one difference; the CPP or cementitious media must be dried at an elevated temperature of 90 to 100° C. for at least 24 hours. As with all media discussed above, if an iron oxide or silica coating is not fully dry before rinsing, some of the coating will be washed off. While this is also a concern for manganese or aluminum oxide coatings it is less of a concern since these oxides usually bond far better to substrates such as CPP (and prepared polymer beads) than iron oxides. When the amphoteric compound is included in the concrete mix in a sufficient amount as an admixture, the occurrence of the amphoteric compound on the surface of the concrete media is sufficiently dense and uniform over a substantial part of the media surface such that the amphoteric compound acts as and should be considered a "coating" as that term is used elsewhere in this application.

With cementitious material as a porous matrix (i.e. as a substrate), final pH conditioning of the iron oxide coating is usually not required because the alkaline nature of the cement raises the pH to acceptable levels. In fact, the acidic nature of the iron oxide solution (and to a lesser extent the manganese or aluminum solution) actually creates more internal porosity of the CPP by consuming a portion of the cement matrix through a neutralization reaction. However, this increased internal porosity may also result in a reduction in the cement matrix's strength. This is problem which is less prevalent when manganese, aluminum or silicon is the base metal salt, or combinations thereof, for the amphoteric substance or compound.

Figure 4:
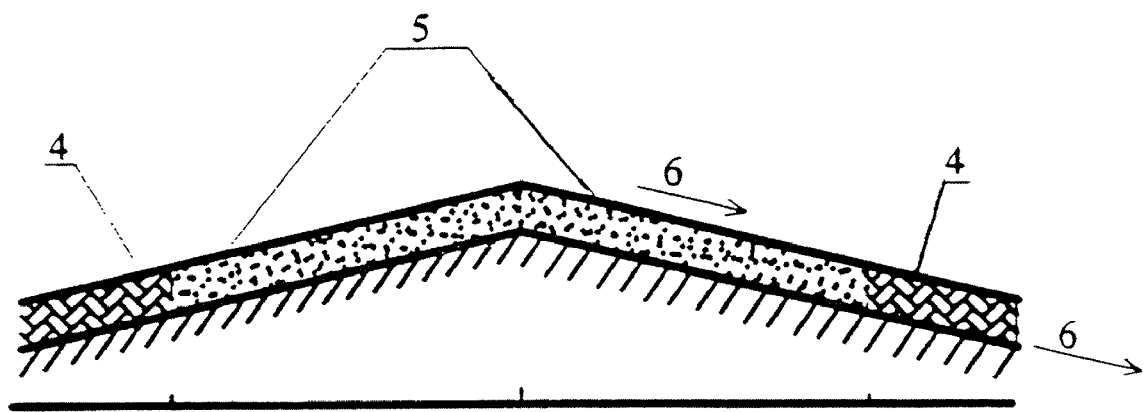
FIG. 4 is a cross-section of a roadway.

One useful application of a CPP coated with an amphoteric compound is as a paved area, parking area or roadway shoulder filtering section. For example, FIG. 4 illustrates a cross-section of a typical roadway. The roadway will have driving lanes 5 with shoulders 4. In the embodiment of FIG. 4, the shoulders are formed of a CPP having an amphoteric compound coating as described above. Typically, the CPP shoulder will have a thickness ranging from 4 to 16 inches. Rainfall-runoff or snowmelt depicted by arrows 6 will flow off of the driving lanes 5 and onto the CPP shoulders 4. The runoff will infiltrate and percolate into the CPP material and dissolved ionic species, complexed species or particulate-bound species will be sorbed or filtered by the amphoteric compound on the CPP material. The intercepted runoff that has been treated will then flow out of the side and bottom of the CPP shoulders 4.

Another application of cementitious material or concrete produced with an amphoteric solution is use as a crushed aggregate filter media. In other words, the object is not to have water flow through the individual pores of a concrete block, but to have it flow around broken up concrete rubble. To create a concrete media or cement media that is fully impregnated with manganese, the water-cement ratio would be higher to ensure sufficient cohesive and adhesive bonding within each piece of media. In this situation, the water cement ratios are close to that of standard concrete mixes and a preferred range would be 0.30 to 0.90. This water cement ratio includes the aqueous solution gained from the admixture. This will be referred to as the "aqueous solution cement ratio" to imply that both water and the admixture solution are considered in computing the ratio. The concrete would be mixed as above and once it hardens (from example, after 12 hours), it is broken up as rubble into media sizes of choice. In certain embodiments, these sizes can range from 0.1 to 10 mm, but sometimes larger, up to 100 mm or more and other embodiments could include any sub-range between 0.01 and 500 mm. If the amphoteric admixture did not provide sufficient amphoteric substance on the accessible surfaces of the rubble, the rubble could then be coated with a layer of amphoteric compound such as described above in regards to polyethylene beads. It will be understood that a bed of granular porous pavement will have an enhanced porosity as opposed to largely impermeable media pieces (e.g., polymer beads). Granular porous pavement media will have pores between discrete pieces of media in addition to the pores within the pieces of media themselves. In one embodiment, this combined porosity of the media is about 0.1 to about 0.6 for media with little internal porosity and in another embodiment is about 0.2 to about 0.8 for media with internal porosity.

In other embodiments, polymeric compounds or organic-based materials that include light weight materials with a specific gravity of less than about 1.0 and in other embodiments, less than about 0.9 can be applied with a thin cement paste that contains an amphoteric substance (e.g., manganese, iron, aluminum or silica based). There are at least two methods by which the amphoteric substance may be applied. First is a two stage process: 1) a thin cement paste which hydrates and hardens (preferably in hours) is applied to the media; and 2) then the media is coated with a solution containing an amphoteric substance of manganese, iron, aluminum or silica. In a single step process, the cement mix contains an amphoteric compound solution as an admixture (prior to the cements application to the substrate) in order to produce the amphoteric substance on or in the substrate. In either case, the resulting polymeric or organic substrate and coating has a net specific gravity less than 1.0 and floats under quiescent conditions. Both the cement coating and solution can be applied in serial processes with hydration used as an intermediate step between the two applications.

Another method of coating the CPP (or other substrates) includes recoating the media. One example of recoating the media was accomplished by placing the media in a column in which it will be fluidized with a recirculating flow of manganese solution. Thus, 1-kg of media was placed in a vertical column (the column was approximately 2 liters in volume) with a 6-liter recirculating solution of $10^{-3}$ M $NaHCO_3$ and 0.035-moles/liter $Mn^{2+}$ (stoichiometric amount) and re-circulating this solution with a pump capable of handling aggressive solutions and with a sufficient capacity to fluidize the bed. The $Mn^{2+}$ is oxidized by adding 250-mL of a 0.185 M solution of NaOCl at a flow rate of 5 mL/minute for 1 hour to ensure complete oxidation of the manganese. The manganese oxide in this solution is then re-circulated for an additional 2 hours with 250-mL of 0.185 M NaOCl added in one step at the beginning of the 2 hours. After 2 hours, the solution was drained and then replaced with water (in the lab, it was de-ionized (Do) water) and re-circulated for 15 minutes and then the column was drained of the water solution. The media was then rinsed with water (DI in lab) to a pH of 7 and then allowed to dry overnight before use. The rising of a manganese oxide coated media with DI water was mainly to remove impurities in order to obtain laboratory quality samples. In practical field applications, the final rinsing of manganese oxide coated media could be dispensed with.

Naturally, re-coating of the media is not limited to manganese oxide upon manganese oxide. Another re-coating method would include a first coating with iron oxide followed by a second coating of manganese oxide. If the iron oxide coated material produces a sufficiently high SSA substrate for the intended application, this latter method may be more desirable since iron oxide is normally less costly than manganese oxide. Thus, a comparatively inexpensive substrate such as sand with a low SSA may be coated with iron oxide to produce a comparatively high SSA substrate (i.e. a substrate with a SSA much greater than 0.1 m²/g). In other words, the iron oxide coated sand becomes the substrate for the final filter media which is coated with manganese oxide. Additionally, the increased SSA achieved by re-coating may be applied to any of the above disclosed substrates (CCP, wood, polymers, etc.) or with other oxides of metals such as aluminum, silica or other surface active materials of high surface area and amphoteric nature. A combination of coatings can allow the same media or CPP system to incorporate sites for adsorption of cations and anions.

The scope of the present invention also includes coating formed of combinations of silica with different amphoteric compounds. For example, a substrate could be immersed in a solution containing silica (e.g. about 0.1M to about 5.0M) and aluminum oxide (or iron oxide or manganese oxide, again at example molarities of about 0.1M to about 5.0M) and then heated to dryness. The ratio of silica to aluminum (or iron or manganese) oxide in the solution could vary depending on the ultimate use of the coated substrate, but in one embodiment the ratio could be 1 to 1. However, the solution ratio could vary depending on the desired ratio of total positive charge versus total negative charge at a given target pH. Alternatively, the aforementioned solution could be an admixture to a cementitous porous pavement (CPP) formulation as mentioned earlier in this specification.

A combination coating could also be formed by a serial process. In other words, first submersing the substrate in a silica solution (and heating to dryness) and then submersing the silica coated substrate in an aluminum (or iron or manganese) oxide solution before heating to dryness. It will be understood that coatings are not normally completely continuous over the entire surface of the substrate. Imperfections will result in breaks in the upper coating (aluminum oxide coating in the above example) allowing the lower coating to be exposed to the environment and bond with ions or complexes of the appropriate charge. Naturally, the serial embodiment of the invention is not limited to a silica coating followed by another coating, but could be formed in the reverse order. Nor are the combinations limited to including silica, but could be combinations of iron, aluminum, or manganese oxides with no silica present. Likewise, anywhere in this description where oxides of iron, aluminum, manganese, or silicon are described, it will be understood the invention could alternatively include non-oxide states of these metals and could include any method of applying one or more of these metals to a media substrate.

Figure 5B:
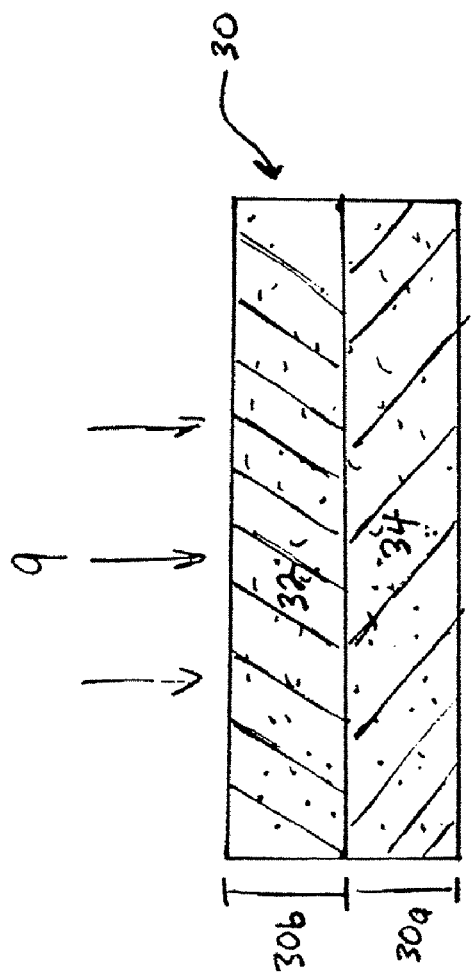
FIG. 5B is a filter system formed of a fixed matrix media having two different layers of amphoteric material.
Figure 5A:
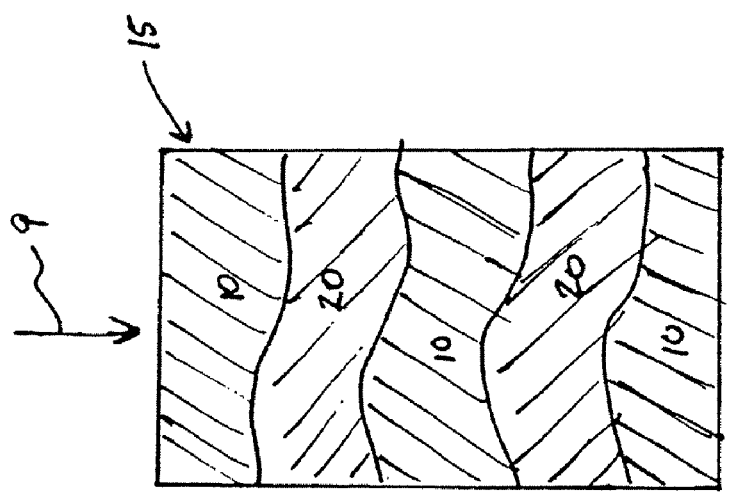
FIG. 5A is a filter system having multiple layers of different amphoteric media positioned therein.

Rather than coating the same substrate particles with a combination of amphoteric compounds, a similar effect may be obtained by mixing substrate particles having different compounds coated thereon. For example, a first quantity of media could be coated with aluminum oxide and a second quantity of media coated with silica. To form the final amphoteric compound coated filter media, the two types of sand would be thoroughly mixed. An alternative embodiment could comprise different types of filter media in alternating layers. For example, FIG. 5A represents a filter column 15 having alternating layers 10 of aluminum oxide coated sand and layers 20 of silica coated sand and a contaminated water stream 9 flowing therethrough. Naturally, the same type filter could be implemented using other coated media such as crushed CCP or polymer beads as disclosed above. Rather than a filter column with a discrete particle filter media, the same concept could be carried out in a CPP block having a contaminated water stream 9 flowing therethrough. The CPP block 30 is formed by first submersing the lower half 30a of block 30 in an aluminum salt or oxide solution (and allowing to dry) to form coated layer 32. Then the upper half 30b is submersed in a silica solution to form coated layer 34. When a contaminated waste stream 9 passes through the porous pavement material, the stream first encounters the aluminum oxide coated layer and then encounters the silica coated layer.

Naturally, there are many different ways to achieve the effect of two different coatings. For example, the block 30 in FIG. 5B could be formed using an admixture of silica solution in the cement mix, thus causing the entire block to initial have a silica coating. Then, the lower half 30a could be immersed in an aluminum oxide or salt solution, causing lower half 30a to have an aluminum oxide coating. These and all other methods of obtaining a combined coating of two different amphoteric coatings are included in the scope of the present invention. It will also be understood that by using amphoteric compounds with different pzc's at a given pH, it will be possible to have substrate layers having different net charges. For example, at a neutral pH, silica will have a net negative charge for removing positively charged metal contaminants while aluminum oxide will have a net positive charge for capturing negatively charge contaminants.

Other embodiments of the present invention include not only coating a CCP block through its entire depth, but also coating only a fraction of the overall depth of the block. For example, the upper area 30b in FIG. 5 could be coated with one of the above mentioned amphoteric compounds, when the lower area 30a is left uncoated. The coated depth could be as little as half an inch, but more typically will be one half or more of the total depth of the CCP block.

Additionally, substates could be formed from any porous structure having a fixed matrix. An example of such a porous fixed matrix would be solidified lava (lava rock or pumice). A fixed matrix having a porosity of between 0.05 and 0.6 would be one embodiment of the present invention.

The present invention may be put to enumerable uses. For example, while the above disclosure discusses a cementitious porous pavement material, the porous pavement material could also be bituminous or asphaltic. Porous asphalt can be made by reducing the asphaltic binder and, in effect, producing a lower binder—aggregate ratio. Typically, the amphoteric compounds described above may also be added to the bituminous porous pavements during the mixing stage, creating the same type of waterborne metals filter. However, with all porous materials, an amphoteric material can always be added as a surface coating and much of the porous surface can be coated by application of a spray on the porous surface. If practical to immerse the asphalt material in an amphoteric solution, the amphoteric solution may be applied in this manner. As used herein, "immersed" does not necessarily mean the entire volume being completely submerged in a solution, but also includes dipping only a part of the media volume in a solution.

Large areas of porous pavements may also be used as storm water storage basins. Parking lots and similar large paved areas are often the source of significant volumes of rainfall-runoff or snowmelt. The porous pavement of the present invention provides a means of substantially reducing the volume of runoff or snowment from such large pavement areas. These areas may be defined as a ratio of their length to width. In certain embodiments of the present invention, a storage basin may be any pavement area having a length to width ratio (i.e. length/width) of less than 20. A typical parking area formed of porous pavement could have a porous pavement with a hydraulic conductivity of between 0.0001 cm/sec and 1.0 cm/sec and more preferably of around at least 0.001 cm/sec. Because it is not necessary to transfer the water so quickly in parking areas, it may be preferred to have higher strength and lower hydraulic conductivity. Porous pavement having a hydraulic conductivity of 0.0001 cm/sec. and 1.0 cm/sec will normally have a 28-day unconfined compressive strength in one embodiment of between approximately 2000 and 6000 psi and in another embodiment between approximately 3000 psi and 5000 psi. The porosity of the pavement in one embodiment will be between approximately 0.1 and 0.6 and in another embodiment between approximately 0.15 and 0.5, and in a third embodiment between approximately 0.2 and 0.35. In one embodiment, such a layer of porous pavement could be at least four to eight inches in depth and in another embodiment, at least twelve to fifteen inches in depth. This depth provides both the necessary strength to support vehicular traffic and also provides a sufficient volume of pore space to store the water from a water quality rainfall-runoff event With a porosity of 0.15 to 0.35, a 6 inch slab of porous pavement could retain as much as 1 to 2 inches of rainfall in that slab. Rather than placing further strain on storm sewers, the rain collected in the porous pavement will be left to evaporate during dryer days. This method of storing runoff from parking lots has the further benefit of tending to immobilize parking lot pollutants entrained by the rain water. Rather than leaving the premises of the parking lot, such pollutants will be retained in the porous pavement. As the water evaporates from the porous pavement over time, the pollutants will tend to be retained in the pavement. Many volatile pollutants may be volatized into the air during evaporation through the CPP material, a process which is preferable to the pollutants becoming dissolved as mobile solutes in water. Additionally, the porous pavement may be treated with an amphoteric compound in order to improve the capture of waterborne ionic constituents which are held in the porous pavement while the retained water evaporates. It can readily be seen how a parking lot constructed of porous pavement will form a storm water storage basin capable of supporting vehicular traffic.

Another embodiment of the present invention includes a roadway gravel shoulder capable of capturing waterborne ionic constituents entrained in roadway rain runoff. Roadways often have gravel shoulders at least four inches in depth, more typically six to eight inches in depth and for larger roadways, often over eight inches in depth. Commonly, the gravel for roadways is graded to have an average diameter of between three-fourths of an inch to one inch. To carry out one embodiment of the invention, the gravel may be coated with an amphoteric compound such as one of the iron, manganese, aluminum, or silica oxides disclosed above. In one embodiment, this would be done prior to placing the gravel as a roadway shoulder. Any of the coating processes discuss above would be suitable, but the previously described field method for producing large quantities of iron oxide coated sand would be one preferred method. The gravel could also be subject to the multiple layer coating also described above. Once the coating process for the gravel was complete, the gravel would be placed along the roadside in the normal manner for creating a shoulder. This manner of capturing waterborne ionic constituents is advantageous because it can passively filter and treat pavement sheet flow directly at the edge of the pavement before the flow becomes concentrated.

A still further embodiment of the present invention encompasses coating a flexible, planar, porous substrate with an amphoteric compound. One example of a flexible planar, porous substrate would be geosynthetic fabrics which are well known in the art. Geosynthetic fabrics are generally polymeric materials which are designed to be placed in or against soil. Often geosynthetic fabrics are used to retain soil in place while allowing water to pass through the fabric. Geosynthetic fabrics may be woven or nonwoven. Woven geosynthetic fabrics are fabrics with filaments in warp (machine direction) and weft (cross-machine) direction. Nonwoven fabrics have essentially a random fabric or textile structure. For example, common felt is a nonwoven textile. Nonwovens are further characterized according to how fibers are interlocked or bonded, which is achieved by mechanical, chemical, thermal or solvent means. Some of the polymeric materials used to construct geosynthetic fabrics include: polyethylenes—PE, HDPE, LDPE, XLPE, FLPE, CPE, CSPE; polypropylene—PP, polysulfone—PSF; polyurethane—PUR; polycarbonate—PC; polyvinyl chloride—PVC, polystyrene—PS; thermoplastic elastomer—TPE; nylon—PA; polyester—PET; nytrile; butyl; acetal—ACL; and polyamide—PA. Most typically, geosynthetics are formed from PE, PP, PVC, PET, PA or PS. The application of an amphoteric substance to the geosynthetics could be carried out by a process similar to that described above for coating polyethylene beads. However, rather than stirring the beads, the sheets of fabric are dipped in solution, pulled them out of the amphoteric solution, and then dried them. The sheet could be left in the solution while dried, but this method wastes a substantial amount of amphoteric solution. With fabric or sheet material, the one technique would be to spray on the solution and dry or to dip in the solution and dry.

Geosynthetic materials coated with amphoteric substances can serve as more effective filters (higher surface area and surface roughness) which can adsorb cations (e.g. heavy metals) or anions (e.g. phosphates) depending on the pH of the aqueous stream, seepage, groundwater, or the like. The filters of the present invention can be in-situ or ex-situ. An example of an in-situ filter would be where one has shallow contaminated groundwater or one is directing a flow of storm water into a trench. One can place a sheet of amphoteric substance coated (with or without a cementitious coating for the substance) geosynthetic fabric in a trench, backfill around it and let the flow passively move through the trench and therefore move through the more permeable geosynthetic to provide in-situ treatment. Alternatively, a cementitious coating could be applied to the geosynthetic fabric with the amphoteric substance either being applied to the cement after drying or as an admixture to the cement during its mixing. Ex-situ filters would be all of those cases where one does treatment in some form of a device or reactor, like the upflow column seen in FIG. 1.

Another example of a flexible planar, porous substrate would be membrane materials. Membrane materials typically have much smaller pore sizes than other filters, commercially available on the order of 0.1 to 50 microns and can be up to 3000 or more microns. Often membrane materials are formed from a type of cellulose such as cellulose acetate, cellulose esters, cellulose nitrate, or nitrocellulose. The amphoteric coating may be applied as described above for oxide coated geosynthetics. The membrane substrates may be considered "membrane filters" in the sense that they capture constituents only on their surface. This is distinguished from the other substrates described herein which act as "depth filters." Depth filters capture constituents through some depth (even if relatively shallow) in the substrate.

The flexible planar, porous substrate could also include any number of convention filter materials or devices which have a larger area dimension than depth dimension. For example, conventional air conditioning or furnace cartridge filters could be formed by having an amphoteric compound applied to the filter media within the cartridge. The filter media will typically be a fibrous polymeric or glass material woven or meshed together at different densities depending on the intended use of the filter.

A further embodiment of the present invention includes a drainage pipe capable of capturing waterborne ionic constituents. Most storm water runoff is carried through conventional concrete pipes for at least part of the journey to its final collection point. Thus there is the opportunity to bring the runoff into contact with a pipe surface coated with an amphoteric compound and remove ionic constituents from the water. Typically, drainage lines are sized to accommodate a standard runoff rate which is less than the total capacity of the drainage pipes. In other words, drainage lines are not designed to have the average runoff completely fill the volume of the drainage pipe. This means that less than the entire inner circumference of the pipe is designed to come into contact with the runoff water. Therefore, it may not be necessary to coat the entire interior of the pipe with the amphoteric compound, but rather only coat the portion of the inner pipe surface designed to be in contact with the water. It will be obvious that the decision concerning how much of the inner surface of the pipe should be coated is a engineering design choice which will vary according to the design parameters. One manner of applying the amphoteric compound will simply be to immerse the section of pipe to be coated in an amphoteric compound containing solution such as disclosed above. For example, the solution could be a 1 to 3 molar ferric nitrate or ferric chloride solution or a 0.1 to 5 molar solution of either birnessite or cryptomelane, or aluminum or silicon. Alternatively, the amphoteric solution could be applied directly to the pipe surface by spraying and the like.

The piping could be formed out of conventional concrete or a CPP material such as described above. The CPP piping would most likely be used when the pipe grade was above the water table or placed in soil which could otherwise readily absorb runoff. In this manner, runoff flowing through the water could be at least partially returned to the ground around the run of the pipeline. The CPP piping could in one embodiment have a hydraulic conductivity ranging from about 0.0001 to about 1.0 cm/sec. Both the CPP piping and conventional concrete piping could have the amphoteric compound introduced in the mixing process prior to the concrete mixture being placed in the pipe forms. It is also in the scope of the present invention to include conventional fired clay piping which has been coated with an amphoteric compound or a specially made clay piping which has had the amphoteric compound added as part of the clay mixture before the pipe is fired.

Another embodiment of the present invention comprises forming a filter by placing an amphoteric compound in a clay liner or in a roadway sub-base. As used herein, the term "sub-base" is intended to include a roadway sub-base formed of clay, silt or sand or a mixture of these materials or recycled materials. This sub-base may be water pervious or impervious. Conventionally, a sub-base is formed by placing a layer of uncompacted soil or recycled material over the area where the sub-base is to be constructed. Water is then added to bring the sub-base to its optimum compacted moisture content. The layer is then compacted to a predetermined density. Typically, this process is carried out in layers or "lifts" as is well known in the art. The optimum compacted moisture content is determined by standard testing procedures such as set out in ASTM D698. An improved sub-base according to the present invention may be constructed by raising the uncompacted sub-base to its optimum compacted moisture content with a solution containing an amphoteric compound. It may not be necessary to add the amphoteric solution to all lifts, but simply the upper most 1 to 3 lifts. Clays have a wide range of SSA values ranging from approximately 15 $m^2/g$ for clays like kaolinite or illite up to approximately 850 $m^2/g$ for clays like sodium montmorrillinite. Their large SSA values make clays a highly effective substrate for applying amphoteric compounds.

Another geotechnical structure utilizing amphoteric substance could be water impervious clay liners. While clay liners are intended to be water impermeable, it is common for liners to have some permeability resulting in water escaping from within the liner into the surrounding soil. If the clay liner is treated with an amphoteric substance, water traveling along the liner (toward the break) or through the liner will have ionic constituents sorbed from it. In a similar manner, some roadways are built with sub-bases which are intended to be water impervious. Generally, it is also not intended to have water flow through the pavement to the sub-base. However, cracking in roadways is commonplace and rainwater migrates through the cracks to the sub-base. If the sub-base retains its water impermeable characteristics, water will flow laterally to the edge of the roadway. If the sub-base is coated with an amphoteric substance, ionic constituents are effectively removed as the water travels along the sub-base toward the edge of the roadway. If the sub-base also forms cracks, water flowing through the sub-base will be treated.

Figure 5C:
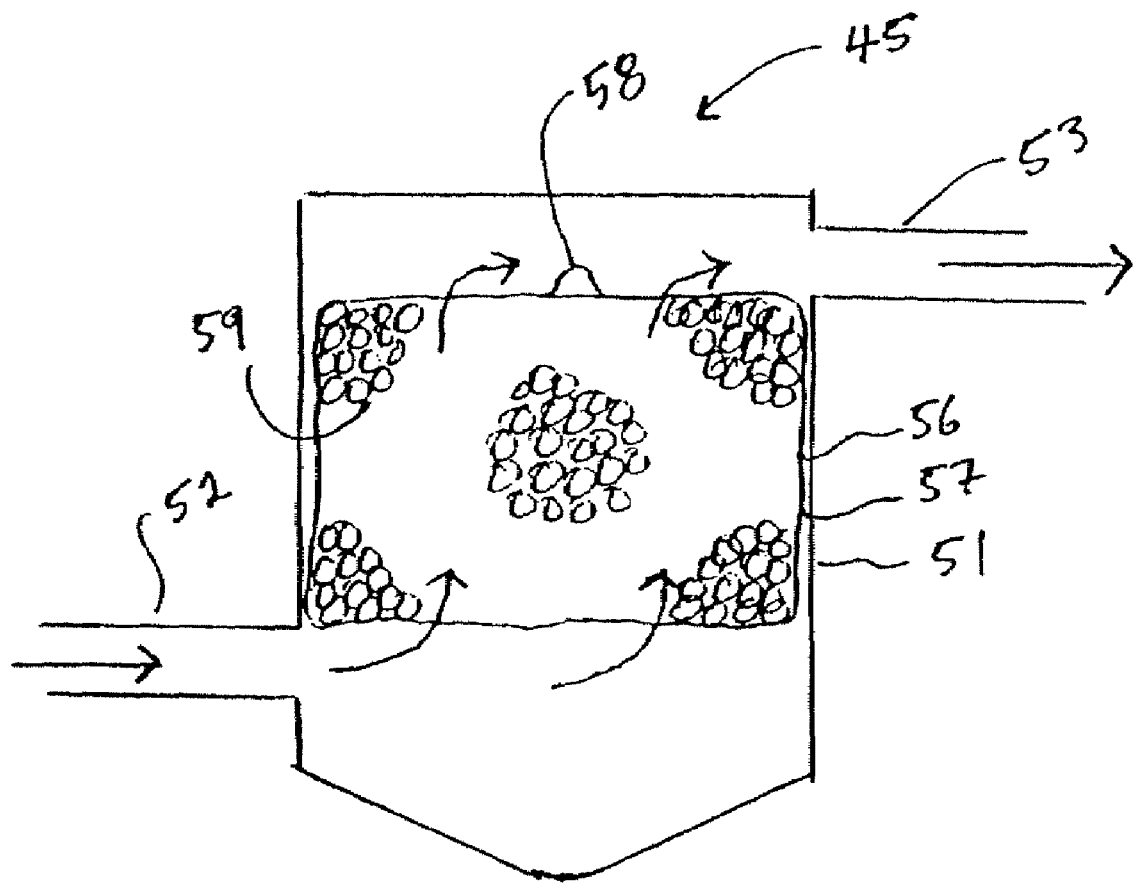
FIG. 5C is a filter system having a containment of media in a filter housing.

FIG. 5C is a further filter system embodiment of the present invention. Filter system 45 generally comprises rigid filter housing 51 having an inlet 52 and an outlet 53. Positioned within housing 51 is a filter media containment 56. In one preferred embodiment, filter media containment 56 is form of a porous flexible material such as a geosynthetic fabric 57 with sufficient strength characteristics to contain the selected media without tearing or failing. This embodiment of media containment 56 is sized to be generally the same shape as and to fit closely against the walls of housing 51. A handle 58 may be attached to media containment 56 to allow easy insertion into and removal from housing 51.

In the embodiment shown, media containment 56 encloses a quantity of granular media 59. In a preferred embodiment, granular media 59 is a crushed concrete aggregate having an amphoteric compound formed thereon (as described above). A typical size range for the aggregate will be about 1-10 mm, but is not limited to this size range. The crushed concrete aggregate could be formed from porous or nonporous cementitious concrete. Likewise, granular media 59 could be formed of other substances such as sand coated with an amphoteric compound. Naturally geosynthetic fabric with less porosity would be used when the media is sand as opposed to the larger crushed concrete media pieces. In an alternative embodiment, floating granular media could also be employed. It will be understood that although FIG. 5C (and FIGS. 6A-8B) are showing open space within media containment 56, the figures are intended to convey conceptually that media containment 56 is substantially full of granular media 59. In each of these configurations lightweight media with a specific gravity of less than 1.0 can be applied.

A somewhat different configuration of filter system 50 is shown in FIGS. 6A and 6B. FIG. 6A is a side view of filter system 50 illustrating a rigid filter housing 51 having an inlet 52 and outlet 53. The filter system of FIG. 6A differs from that of FIG. 5C in that there is an interior hollow column 54 which forms an annular space 55 (best seen in FIG. 6B) between the outer wall of housing 51 and hollow column 54. The liquid stream to be treated enters the top of hollow column 54 and flows downward to exit through side openings 60 in the bottom of hollow column 54 and enter into annular space 55.

Positioned within annular space 55 is the toroidal or ring shaped media containment 56. As in the previous embodiment, media containment 56 could be formed of geosynthetic fabric 57 of sufficient strength characteristics, but could also be of any material (flexible or rigid) which contains granular media 59. While in the embodiment shown, media containment 56 is formed of a uniformly porous fabric, other embodiments of media containment 56 could include other configurations wherein less than the entirety of media containment 56 is porous. For example, the top and bottom of media containment 56 (where fluid must pass) being porous while the sides of media containment 56 are substantially non-porous. As with the previous embodiment, granular media 59 could comprise a crushed concrete aggregate having an amphoteric compound formed thereon, coated sand, or any other coated granular media such as media with a specific gravity less than 1.0.

A still further embodiment is seen in FIGS. 7A and 7B. FIG. 7A illustrates a down spout filter 65. Filter 65 generally comprises a flexible media containment 66 of sufficient strength characteristics filled with granular media 68 and having a connecting sleeve portion 69 which slides over the terminal end of conventional drainage down spout 70. Media containment 66 will generally not be sufficiently porous to allow the passage of water. However, outlet apertures 67 (or a porous area) will be formed in some portion of media containment 66 (the top portion in the example of FIG. 7A) in order to allow water flowing into media containment 67 to exit there from after passing through filter media 68.

FIG. 7B illustrates a filter system connected to a bridge down spout 71. The embodiment of FIG. 7B is largely similar to that of FIG. 7A. However, it will be understood that media containment 66 might typically hang freely from bridge down spout 71 and must have sufficient material strength to support the weight of filter media 68 by way of sleeve portion 69 being firmly clamped to down spout 71. As with the previous embodiment, granular media 68 could comprise a crushed concrete aggregate having an amphoteric compound formed thereon, coated sand, or any other coated granular media. A media formed of amphoteric compound coated polymer beads or other lightweight media would be particularly suitable for the embodiment of FIG. 7B since this would provide the least weight stress on the hanging media containment 66.

The size and shapes of media containments 66 (and other media containments disclosed in this application) will largely depend on the flow path in which it is desired to direct the liquid. The flow path should be sufficiently long to ensure the liquid has sufficient residence time when passing through the filter media in order to bring a sufficient percentage of the liquid borne contaminants into contact with the filter media. Factors such as the pressure, head loss and flow rate of the liquid, the media size, hydrodynamics, desired residence time, and ultimately performance will affect the size and shape of the media containment.

Figure 8B:
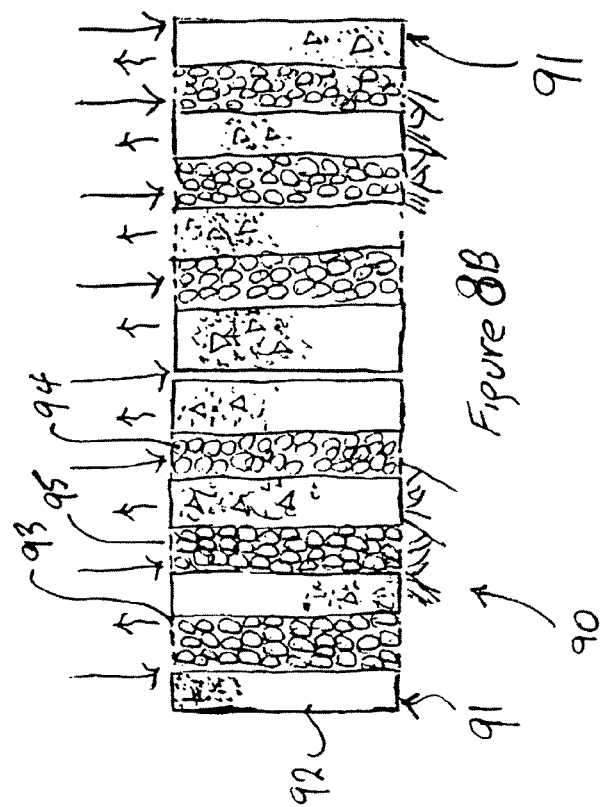
FIGS. 8A-8C are filters illustrating different manners of containing a granular media.
Figure 8A:
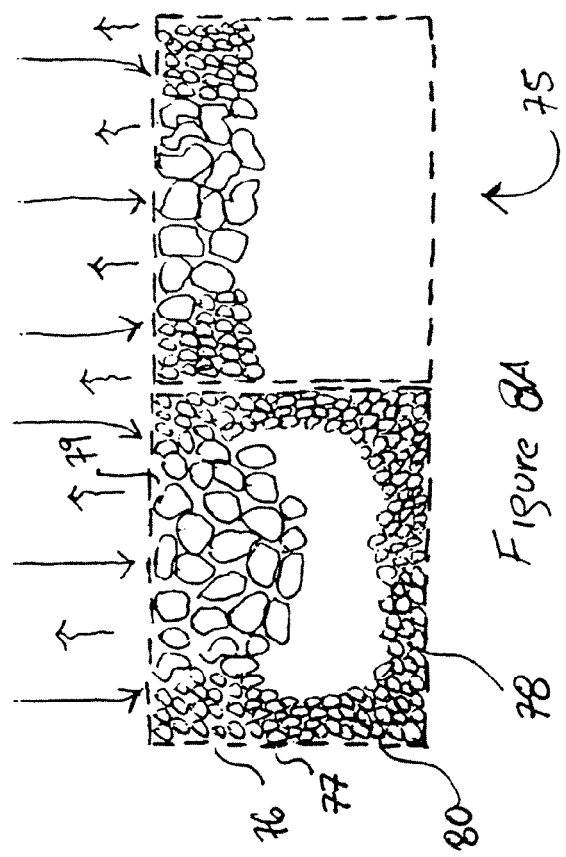

FIG. 8A illustrates a still further embodiment of the filtration system of the present invention. In FIG. 8A, filter system 75 consists of a granular media 78 positioned within filter containment 76. In this embodiment, filter containment 76 will comprise a mesh material 77 which could be a porous geosynthetic material, natural porous material but could also be a wire mesh such as conventional "hardware cloth", "chicken wire" or chain-link fencing wire. In the typical situation where the wire mesh has openings larger than the media particles, a finer mesh such wire window screening could be placed as a liner within the larger gauge wire mesh.

In a preferred embodiment, filter containment 76 will be shaped such that when filled with filter media, filter containment 76 forms a block shape. Then filter containment 76 (or several filter containments 76) will be arranged in the flow path of the liquid stream to be filtered. FIG. 8A suggests that the liquid steam is flowing toward the top portion of filter system 75. It can be seen that the filter media 78 in FIG. 8A is formed of a size gradation of media particles. Toward the center of media containment 76 are coarser media particles (e.g. on the order of 25 to 100 mm in diameter) while around the outer sides of media containment 76 are finer media particles 80 (e.g. on the order of 1 to 20 mm in diameter). The purpose of these media size differences is to allow freer flow of liquid to the center area of media containment 76 and retard the flow of liquid toward the edges of media containment 76. This media configuration will help ensure sufficient residence time of the liquid flowing from top to bottom through the media as opposed to liquid taking a shorter side path toward the outer edges of media containment 76.

FIG. 8B illustrates yet another embodiment of the filter system of the present invention. Filter system 90 will comprise concrete blocks 91 with bore holes 93 formed therethrough. FIG. 8B is a cross-sectional view and it will be understood that continuous concrete extends around the parameter of blocks 91 to maintain the block's structural integrity. The bore holes 93 will be filled with granular amphoteric compound coated media 94 and a porous fabric or wire mesh 95 will extend across the tops and bottoms of bore holes 93 in order to retain the granular media therein. As with the previous embodiment, blocks 91 will be position in the liquid steam path such that the liquid is directed through the media filled bore holes 93.

Figure 8C:
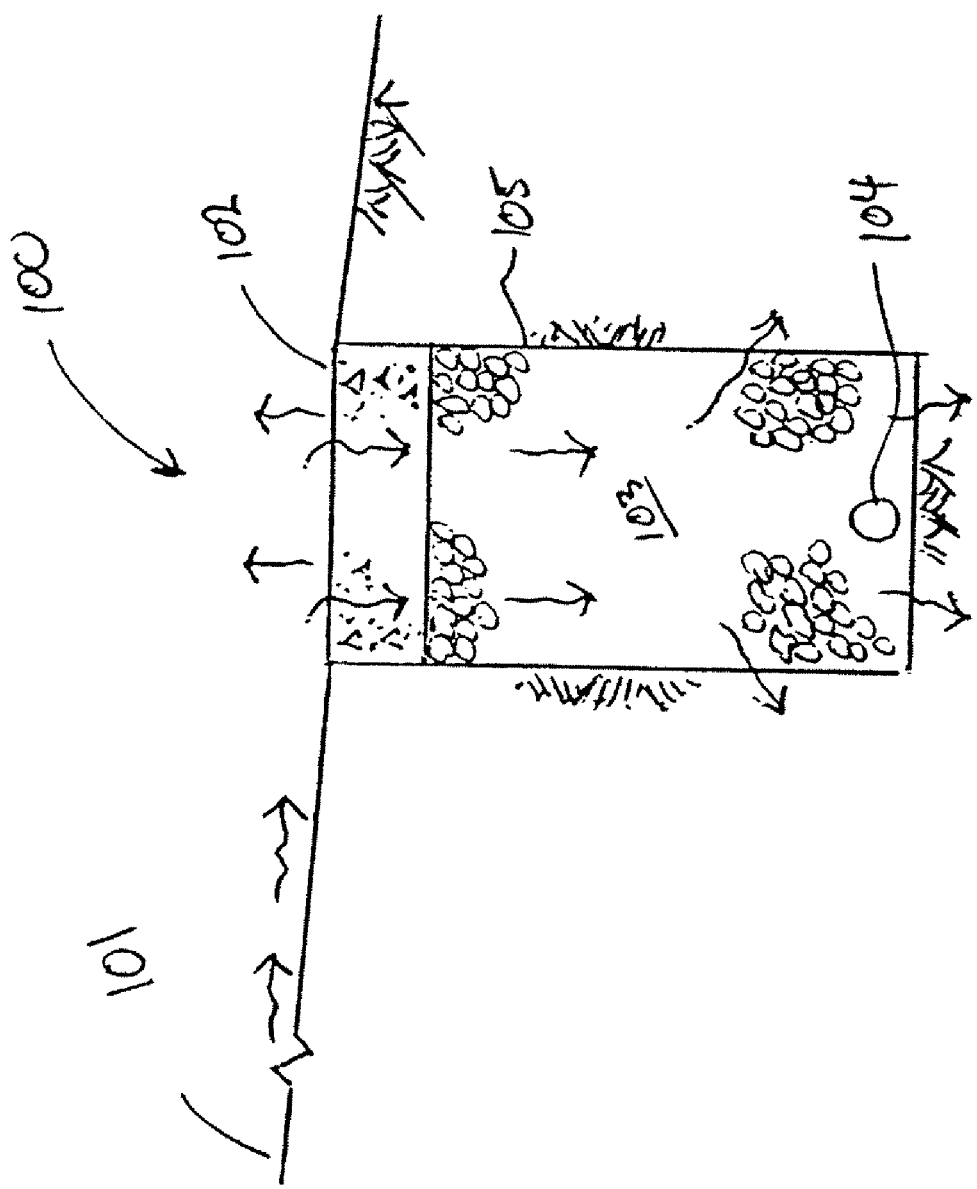

FIG. 8C illustrates a filter system 100 which will generally be employed adjacent to a paved area 101 such as a parking lot or roadway (in which case the paved area 101 may act as a roadway shoulder). A trench 105 is formed adjacent to the paved area 101. Trench 105 will have a perforated drain pipe 105 positioned at its bottom and will be filled with a granular media 103 such as amphoteric compound coated sand. A cap 102 of cementitious porous pavement will then be placed over granular media 103. In operation, contaminant containing runoff from paved area 101 will flow across and into porous pavement 102 and then through coated media 103 wherein positively and/or negatively charged (depending on the media coating) ions and complexes are removed before the treated water exits through discharge drain 104. As one illustrative example, trench 105 could be approximately 60 cm deep, 30 cm wide, and cap 10 cm thick. However, the filter system 100 could take on any dimensions required by the particular design being implemented.

In certain media embodiments described above where the amphoteric substance is applied as a coating, the coating may be comprised predominately of aluminum, iron, manganese, silicon or combinations of these metals (or their oxides) such that the total dry mass of the applied coating (to external and internal surface areas) is greater than 0.05 milligrams per dry gram of media substrate. Multiple layers of applied coatings would have a linearly proportional composition per dry gram of media substrate. For example, two applied layers would result in a media with a dry mass of applied coating that is greater than 0.10 milligrams per dry gram of media substrate.

In certain embodiments where the amphoteric substance is applied as an admixture, the admixture may be comprised of predominately of aluminum, iron, manganese, silicon or combinations of these metals (or their oxides) such that the total dry mass of remaining admixture that is a component of the media is greater than 0.05 milligrams per dry gram of media.

In one embodiment where the media is coated with a cementitious layer, the cementitious coating shall be such that the total dry mass of the applied cementitious coating (to internal and external surface areas of the media) is greater than 0.10 milligrams per dry gram of media substrate. Multiple layers of applied coatings could have a linearly proportional composition per dry gram of media substrate. For example, two applied cementitious layers would result in a media with a dry mass of applied coating that is greater than 0.20 milligrams per dry gram of media substrate.

In many of the embodiments described above, the total dry mass of the applied amphoteric substance per dry gram of media may be at least 0.5 mg/g and alternatively ranging from about 0.5 mg/g to about 50 mg/g. In alternative embodiments, amphoteric substance could range from about 1 to about 20 mg/g or from about 5 mg/g to about 10 mg/g. Other embodiments include all sub-ranges between about 0.5 mg/g and about 50 mg/g.

Alternative Embodiments

While the foregoing invention has often been described in terms of specific examples, those skilled in the art will recognize many variations which are intended to fall within the scope of the claims. For example, while the above has described the media as utilized for removal of dissolved cations and anions, complexed species and particulate-bound species from water, the media could be utilized to remove many types of airborne or waterborne non-ionic constituents. In particular, sand or polyethylene beads filters could readily be adapted to treat flows of air for ionic constituents such as aerosols, charged particulate matter, odors, and gas emissions containing water vapor with anionic or cationic species.

One embodiment of a filtration system for removing negatively or positively charged ions, complexes or particulates from an aqueous stream, may include: a) an aqueous stream formed substantially of urban runoff; b) a filter containment communicating with the aqueous stream such that at least part of the stream passes through the filter containment; and c) a filter media disposed within the filter containment, the filter media comprising an amphoteric material applied thereto, wherein is amphoteric material is an oxide of at least one of Al, Mn, Fe or Si. The above filtration system wherein the aqueous stream is a variable stream generated by a rainfall-runoff or snowmelt event.

The above filtration system wherein the aqueous stream has a pH of between about 6 and about 9. The above filtration system wherein the filter media is a granular media having a total porosity of between about 0.1 and about 0.6. The above filtration system wherein the filter media is a fixed matrix media having a total porosity of between about 0.1 and about 0.4. The above filtration system wherein the fixed matrix is a cementitious porous material.

The above filtration system wherein the amphoteric media comprises both an oxide of Si and an oxide of one of Al, Mn, or Fe. The above filtration system wherein the Si oxide media and the media comprising an oxide of one of Al, Mn, or Fe are intermixed. The above filtration system wherein the Si oxide media and the media comprising an oxide of one of Al, Mn, or Fe are positioned in distinct layers. The above filtration system wherein the filter containment is formed by a porous textile (or geotextile) material. The above filtration system wherein the filter containment is formed by a porous mesh material. The above filtration system wherein the porous mesh material is a wire mesh. The above filtration system wherein a substantial portion of the aqueous stream is runoff from an urban, constructed, disturbed or paved surface.

The above filtration system wherein the cementitious media has a depth divided into a first and second portion and one amphoteric material is applied to the first portion. The above filtration system wherein a second amphoteric material is applied to the second portion. The above filtration system wherein the amphoteric material is applied as an admixture. The above filtration system wherein the filter system includes a rigid media housing and the filter containment is a flexible material generally shaped to fit within the media housing. The above filtration system wherein the filter media is a granular media having a hydraulic conductivity of between about 1 and about 0.0001 cm/sec. The above filtration system wherein, the filter media is a fixed matrix media having a hydraulic conductivity of between about 1 and about 0.0001 cm/sec. The above filter system wherein the filter containment is in a toroidal shape.

The above filter system wherein the filter containment is formed by positioning granular media within a trench and placing a layer of porous cementitious pavement over the media. The above filter system wherein the filter containment is formed of a mesh material with smaller granular media positioned in the outer portions of the filter containment and larger granular media positioned in the inner portions of the filter containment. The above filter system wherein the filter containment comprises bore holes through a rigid matrix material.

An alternate filtration system for removing ions, complexes or particulates from an aqueous stream would include: a) an aqueous stream containing ions, complexes or particulates; b) a filter containment communicating with the aqueous stream such that at least part of the stream passes through the filter containment; and c) a filter media disposed within the filter containment, the filter media comprising an amphoteric material applied thereto, wherein the amphoteric material is an oxide of Fe and has a crystal inhibiting agent creating a SSA on the filter media of at least about $10 \text{ m}^2/\text{gm}$.

Additional Numbered Embodiments:

Numerous additional embodiments are described in the following numbered format.

1. Discrete Media, Amphoteric Coating of Single Oxide WITH Crystal Inhibitor

One embodiment of the present invention is a sorptive-filtration media for the capture of waterborne or airborne constituents and particles. The media comprises a granular substrate and a single amphoteric compound, preferentially an oxide of aluminum, manganese, iron or silicon bonded to a substrate in the presence of a crystal inhibiting agent.

2. Discrete Media, Amphoteric Coating of Single Oxide WITHOUT Crystal Inhibitor

Another embodiment of the sorptive-filtration media for the capture of waterborne or airborne constituents and particles is a media comprised of a granular substrate and a single amphoteric compound, preferentially an oxide of aluminum, manganese, iron or silicon bonded to granular substrates in either the absence or presence of a crystal inhibiting agent.

3. Discrete Media, Amphoteric Coating of MIXED Oxides WITH Crystal Inhibitor

Another embodiment of the sorptive-filtration media for the capture of waterborne or airborne constituents and particles is a media comprised of a granular substrate and a mixture of amphoteric compounds, preferentially from oxides of aluminum, manganese, iron or silicon bonded to granular substrates in the absence or presence of a crystal inhibiting agent. The solution mixtures are generally binary mixtures (excluding silicon or other crystal inhibiting agent) of iron and manganese, aluminum and manganese, iron and aluminum, iron and manganese, or silicon in combination with either iron, manganese or aluminum. The proportions of the selected oxides will be dependent, in part, on the surface charge, net point of zero charge (pzc), and the relative population of charged sites (both positive and negative) created by the resulting mineral coating at a given pH, in order to target a specific constituent or competitive combination of constituents. Solution mixtures do not have to be only binary. For example, manganese can be added to a binary mixture of iron and aluminum to create a lower net pzc and create a relatively higher proportion of negatively charged sites allowing the treatment of both positively and negatively charged constituents. Certain combinations of oxides will obviate the need for a crystal inhibiting agent. For example, combining a manganese oxide in percentages as low as 1% with an iron oxide can inhibit iron oxide crystal formation.

4. Discrete Media, Amphoteric Coating of MIXED Oxides WITHOUT Crystal Inhibitor

Another embodiment of the sorptive-filtration media for the capture of waterborne or airborne constituents and particles is a media comprised of a granular substrate and a mixture of amphoteric compounds, preferentially from oxides of aluminum, manganese, iron or silicon bonded to granular substrates in the absence of a crystal inhibiting agent. The solution mixtures are binary mixtures, examples of which are iron and manganese, aluminum and manganese, iron and aluminum or silicon in combination with either, iron, manganese or aluminum. The proportions of the selected oxides may be dependent, in part, on the surface charge, net point of zero charge (pzc), and the relative population of charged sites (both positive and negative) created by the resulting mineral coating at a given pH, in order to target a specific constituent or competitive combination of constituents. Solution mixtures do not have to be only binary. For example, manganese can be added to a binary mixture of iron and aluminum to create a lower net pzc and create a relative increase of negatively charged sites allowing the treatment of both positively and negatively charged constituents. One of ordinary skill in the art will recognize that differing ratios of these oxides will result in coatings with a range of differing sorptive-filtration properties and these variable affinities would be altered by design depending on the competitive combination of constituents, aqueous chemistry (for example pH), hydrodynamics, equilibrium capacity and kinetics of the particular situation.

5. Embodiment 1 through 4 Having a Specific Gravity Between 0.2 and 1.0

Another embodiment of the present invention includes a sorptive-filtration media which comprises a substrate as described in embodiment 1 through 4 and having a specific gravity between approximately 0.2 and 1.0.

6. Embodiment 1 through 4 Having a Specific Gravity Between 1.0 and 6.0

Another embodiment of the present invention includes a sorptive-filtration media as described in embodiment 1 through 4 and having a specific gravity between approximately 1.0 and 6.0.

7. Embodiment 1 through 4 Composed of Rock, Earthen or Modified-Earthen Substrate Another embodiment of the present invention includes a sorptive-filtration media which comprises a substrate of rock, native earthen material; such as clay, silt, sand, volcanic material, biological materials such as shells or modified earthen material (for example to create a specific size gradation, altered surface area or bulk density) such as perlite, fired silt or clay particles or rubble, cemented soil material, volcanic material (such as pumice), or calcareous material.

8. Embodiment 1 through 4 Composed of a Cementitious Substrate

Another embodiment of the present invention includes a sorptive-filtration media which comprises a substrate of cementitious material such as created with a Portland cement, lime-cement, combination of calcium-alumina-silica, or a material with pozzolanic attributes; where a pozzolan is a siliceous or siliceous and aluminous material that possesses little or no bonding ability, but when finely ground into a high surface area particles and in the presence of moisture will react with calcium hydroxide at ambient temperatures to form resulting compounds that possess cementitious properties.

9. Embodiment 1 through 4 Composed of Cementitious Substrate and Amphoteric Admixture or Amphoteric Coating Another embodiment of the present invention includes a sorptive-filtration media which comprises a substrate of cementitious material such as created with a portland cement, lime-cement, combination of calcium-alumina-silica, or a material with pozzolanic attributes combined with an metal oxide or metal salt admixture in the cementitious material. One example of such an embodiment is described. The formulation can be scaled to meet specific media amount requirements, or altered to fit porosity, bulk density, surface area or surface charge requirements. This example illustrates an amphoteric coating process for aluminum oxide. However, the coating can be comprised of an oxide of iron, manganese or silicon or a combination of these oxides as described above.

1. Mix portland cement and clean water at a water/cement (w/c) ratio of approximately 0.3 to 0.7. In one embodiment, the water, containers, mixers, forms, admixtures, air-entraining agents, and cement should be free of contamination from the compounds that are intended to be treated by the media produced by this method. Keeping such contaminants out of the resulting substrate/media is beneficial since the substrate will not be acid-washed as with other substrates such as clay, silt, sand, polymeric media, etc.

2. Add a gas-entraining agent. A gas-entraining (or foaming or blowing) agent can function to lower the dry density of the resulting cementitious matrix towards 50 pounds per cubic foot by creating a very large number of very small entrained air bubbles (the conventional philosophy for a concrete based on strength and dimensional stability); or function to create larger and fewer pores. This latter function can be combined with an altered w/c ratio to create a porous cementitious matrix of lower density and a pore size distribution (PSD) that can range from single micron size to millimeter size. The latter function is preferred because the resulting media is a high surface area material with internal media pores that are sufficiently large to result in one mode of hydraulic communication through the media as well as another mode of hydraulic communication through the pore space between the media.

3. There are many gas-entraining agent (derivatives of organic acids, natural or synthetic resins, detergents, anionic surfactants, sulfonates, etc.) and systems that are available. These agents should not contain significant levels of contaminants that are intended to be removed by the media and should not produce a toxicity product. This embodiment utilizes a permeable cementitious matrix in a different manner than in a conventional "impermeable" or "non-pervious application. The preferred attributes of one embodiment of this permeable cementitous media are a non-uniform PSD, open pore structure, lower density, reasonable specimen strength (for example a 28-day compressive strength, $f'_c$ of 50 psi or greater and some resistance to abrasive handling), no contaminants or toxicity residuals and a material that carbonates over time converting calcium hydroxide to calcium carbonate.

4. Once water/cement and gas-entraining or similar agent are mixed and the gas-holding matrix is created, the mix is placed in a mold whose geometry is based on convenience, curing, handling, later crushing, stacking, etc. For example, thinner slabs will allow greater carbonation of material as compared thicker geometries of less surface area. The gas-entrained cementitious material is then cured for a minimum of 12 hours for ambient air curing. Curing can be steam or pressure curing, or both, but this is not required.

5. Once cured, the material is broken or crushed to a selected media size and shape. Broken or crushed media that does not fit the media size requirements is discarded or re-used. The media size gradation can range from uniform (approximately one equivalent diameter size) to non-uniform. Media sizes and size gradations can range from 0.01 to 500 mm depending on head loss requirements and sorptive-filter efficiency requirements.

6. The media is then coated with a minimum concentration of about 0.1-M (or higher depending on coverage requirements) aluminum nitrate. This can be a batch coating process, a dipping process or a spraying process. The porous cementitious material coats well. Once coated, the media is dried at a minimum temperature of 60 C for a minimum of 4 hours to dryness and then washed with clean tap water. The dry media is then sacked or placed in cartridges.

10. Embodiment 1 through 9 with Substrate SSA Greater than 0.1 $m^2/gm$

Another embodiment of the present invention includes a sorptive-filtration media which comprises a substrate with a specific surface area (SSA) of greater than 0.1 $m^2/gm$.

11. Embodiment 1 through 5 with a Polymeric Substrate of SSA Greater than 0.03 $m^2/gm$ Another embodiment of the present invention includes a sorptive-filtration media which comprises a polymeric substrate with a specific surface area (SSA) of greater than 0.03 $m^2/gm$.

12. Embodiment 1 through 5 with a Cemented or Metamorph of Clay or Silt Substrate Another embodiment of the present invention includes a sorptive-filtration media which comprises a clay or silt substrate that has been cemented or has undergone metamorphosis through heating and/or pressure and/or chemical modification. Cementing of clay or silt substrates to form sorptive-filtration media or aggregates can be carried out with Portland cement, lime or cementing agents that are used to form larger aggregate media from binding much smaller clay or silt particles together. Media size ranges can have equivalent diameters between 0.01 mm and 500 mm.

13. Embodiment 12 WITHOUT an Amphoteric Coating

Another embodiment of the present invention includes a sorptive-filtration media which comprises a clay or silt substrate that has been cemented or has undergone metamorphosis through heat and/or pressure and/or chemical modification and no amphoteric coating.

14. Embodiment 1 through 13 with a Particle Size Range from 0.01 mm to 500 mm

Another embodiment of the present invention includes a sorptive-filtration media ranging in size from 0.01 mm to 500 mm. Below 0.01 mm, hydraulic conductivities are too low for the medium to function effectively as a filter at common surface loading rates between 0.1 and 10 gallons/$ft^2$-minute and above 500 mm, specific surface area, pore size and residence times are too large to have a significant benefit on treatment for particles or solutes.

15. Embodiment 12 WITH an Amphoteric Coating

Another embodiment of the present invention includes a sorptive-filtration media which comprises a clay or silt substrate that has been cemented or has undergone metamorphosis through heat and/or pressure and/or chemical modification with an amphoteric coating. One example of such an embodiment is described The formulation can be scaled to meet specific media amount requirements, or altered to fit porosity, bulk density, surface area, surface charge requirements or contaminant sorption requirements. This example illustrates an amphoteric coating of aluminum oxide. However, the coating can be comprised of an oxide of iron, manganese or silicon or a combination of these oxides as described above.

1. Mix 2 kg of water at 15 to 35 C with a biological blowing agent. One preferred blowing agent is yeast which is added at approximately 1% or greater by dry weight of total dry clay. There are a variety of biological blowing agents that can be added. Depending on the mixing conditions, yeast and temperature, this mixing may require several minutes or longer. As soon as the mixture begins to froth or bubble with evolved gas, ground clay is added and mixed into the gas-water mixture. As with a cementitious matrix there are many gas-entraining, foaming or blowing agents for a cohesive matrix. In this example, yeast spores are uniformly interspersed in the clay matrix, coming out of a spore-phase because of the water, temperature and nutrients, to produce copious amounts of gas bubbles. Organic and inorganic chemical blowing agents or phase-changing blowing agents can also be utilized. Physical blowing agents can also be utilized and have shown success. One of the benefits of yeast is that the there is little residual agent left after firing.

2. Mix or blend in 1 kg of ground kaolinite (a common clay mineral) into the 2 kg of water 3. After the kaolinite is blended in, mix rapidly in about ⅓ of 0.5 kg of sodium bentonite (main ingredient in drilling mud, sealing mud, slurry mud), trapping and coalescing the gas bubbles. Allow the viscous clay to set for a minute or longer. A very lumpy texture will begin to form. After several minutes mix in the balance of the bentonite. Put in molds where in this case, clay slurry depth is important. Clay slurry depth in the molds should be at least 1 inch deep. Allow the clay to remain in the molds for 30 minutes or longer at a temperature of at least 15 C before placing in an oven at 60 C for at least 2 hours. One of ordinary skill in the art will recognize that there are many variations of this formulation that will provide differing media porosities and bulk densities depending on media requirements.

4. After drying with sufficient moisture driven off fire the clay at a minimum temperature of 500 C for at least 1 hour or longer. After the firing, allow to cool and the crush or break to same specifications as embodiment 14.

5. Soak media in a 0.1-M or greater nitric acid solution for 30 minutes to remove any residual contaminants that are part of the clay, water, molds or agents. Rinse off acid from media surface with clean water. If there are no contaminants or trace levels of contaminants this step is not required.

6. The media is then coated with a minimum concentration of 0.1-M (or higher depending on coverage requirements) aluminum nitrate. This can be a batch coating process, a dipping process or a spraying process. The porous clay material coats very well because of high surface area and surface charge. Once coated, the media is dried at 60 C for at least 4 hours to dryness and then washed with clean water. The dry media is then sacked or placed in cartridges. The resulting media is very porous, hydroscopic, with a very porous and a rough surface for filtration and has a good compressive strength (cannot be crushed by hand) and is not friable. The media can have significant internal pore structure.

16. Embodiment 1 through 14 WITH an Amphoteric Admixture

Another embodiment of the present invention includes a sorptive-filtration media which comprises a clay or silt substrate that has been cemented or has undergone metamorphosis through heat and/or pressure and/or chemical modification with an amphoteric substance admixture.

17. Embodiment 1 through 14 WITH an Amphoteric Admixture and Coating

Another embodiment of the present invention includes a sorptive-filtration media which comprises a clay or silt substrate that has been cemented or has undergone metamorphosis through heat and/or pressure and/or chemical modification with an amphoteric admixture and a further amphoteric coating.

18. A Porous Pavement Medium WITH a Single Oxide Amphoteric Coating

One embodiment of the present invention is a pavement medium material for the capture of waterborne constituents including particles. The pavement material comprises a porous pavement substrate and a single amphoteric compound, preferentially an oxide of aluminum, manganese, iron or silicon applied to the porous pavement medium substrate in either the absence or presence of a crystal inhibiting agent.

19. A Porous Pavement Medium, WITH Amphoteric Coating of Mixed Oxides

Another embodiment of the present invention is a pavement medium material for the capture of waterborne constituents including particles. The pavement material comprises a porous pavement substrate and a mixture of amphoteric compounds, preferentially from oxides of aluminum, manganese, iron or silicon applied to the porous pavement medium substrate in the absence or presence of a crystal inhibiting agent.

20. A Porous Pavement Medium, WITH Admixture in Binder

Another embodiment of the present invention is a pavement medium material for the capture of waterborne constituents including particles. The pavement material comprises a porous pavement substrate matrix made from a binder wherein the water fraction of this binder is comprised in part of an aqueous solution of an amphoteric metal oxide or salt admixture.

21. A Cementitious Porous Pavement Medium, WITH w/c Admixture

Another embodiment of the present invention is a pavement medium material for the capture of waterborne constituents including particles. The cementitious pavement material comprises a porous pavement substrate matrix made from a water:cement ratio and an amphoteric compound or combinations of aluminum, manganese, iron and silicon compounds utilized as part of the water:cement ratio. In this embodiment, the pavement substrate is also comprised of fine and/or coarse aggregate.

22. A Porous Pavement Medium, WITH Full-Depth Layered Amphoteric Coatings

Another embodiment of the present invention is a pavement medium material for the capture of waterborne constituents including particles. The pavement material comprises a porous pavement substrate with separate horizontal coating layers of amphoteric compounds, preferentially from oxides of aluminum, manganese, iron or silicon, applied to the porous pavement medium substrate in the absence or presence of a crystal inhibiting agent.

23. A Porous Pavement Medium, WITH Partial-Depth Layered Amphoteric Coatings

Another embodiment of the present invention is a pavement medium material for the capture of waterborne constituents including particles. The pavement material comprises a porous pavement substrate with separate horizontal coating layers of amphoteric compounds, preferentially from oxides of aluminum, manganese, iron or silicon, applied to the porous pavement medium substrate in the absence or presence of a crystal inhibiting agent. In one variation of this embodiment, the upper 20% or less of the pavement remains uncoated.

24. A Porous Pavement Medium, WITH Full-Depth Mixture of Amphoteric Coatings

Another embodiment of the present invention is a pavement medium material for the capture of waterborne constituents including particles. The pavement material comprises a porous pavement substrate and a mixture of amphoteric compounds, preferentially from oxides of aluminum, manganese, iron or silicon applied to the porous pavement medium substrate in the absence or presence of a crystal inhibiting agent. In this embodiment the full depth of the pavement is coated with a mixture of amphoteric coatings.

25. A Layered Porous Pavement Medium, WITH Partial-Depth Layered Amphoteric Coatings Another embodiment of the present invention is a pavement medium material for the capture of waterborne constituents including particles. The pavement material comprises a porous pavement substrate with separate pavement material layers. In this embodiment one or more layers will not be applied with an amphoteric compound while one or more other layers will be applied with one or a mixture of amphoteric compounds, preferentially from oxides of aluminum, manganese, iron or silicon, applied to the porous pavement medium substrate in the absence or presence of a crystal inhibiting agent.

26. A 3"Porous Pavement Medium, WITH a Full-Depth of Amphoteric Coating

Another embodiment of the present invention is a pavement medium material for the capture of waterborne constituents including particles. The pavement material comprises a porous pavement substrate and an amphoteric compound or a mixture of amphoteric compounds, preferentially from oxides of aluminum, manganese, iron or silicon applied to the porous pavement medium substrate in the absence or presence of a crystal inhibiting agent. In this embodiment the full depth of the pavement is coated with an amphoteric compound or mixture of amphoteric compounds and the pavement depth is at least 3 inches.

27. A 3"Porous Pavement Medium, WITH a Partial-Depth Amphoteric Coating

Another embodiment of the present invention is a pavement medium material for the capture of waterborne constituents including particles. The pavement material comprises a porous pavement substrate and an amphoteric compound or mixture of compounds preferentially from oxides of aluminum, manganese, iron or silicon applied to the porous pavement medium substrate in the absence or presence of a crystal inhibiting agent. In this embodiment the upper 20% of the pavement is not coated with an amphoteric coating and the pavement depth is at least 3 inches.

28. A 3" or Deeper Porous Pavement Storage Basin

A further embodiment includes a runoff or drainage storage or storage/treatment basin capable of supporting vehicular traffic. The basin comprises a layer of porous pavement having a hydraulic conductivity of more than 0.0001 cm/sec. The layer of porous pavement is at least 3 inches in depth, and the layer has a length and a width wherein the ratio between the length and the width is less than 50. The total porosity of the porous pavement is greater than 0.10. The pavement may comprise a compressive strength of at least about 2000, 3000, or 4000 psi in other embodiments.

29. A 3" or Deeper Porous Pavement Storage Basin w/an Embodiment from 15 through 24

A further embodiment includes a runoff or drainage storage or storage/treatment basin capable of supporting vehicular traffic. The basin comprises a layer of porous pavement having a hydraulic conductivity of more than 0.0001 cm/sec. The layer of porous pavement is at least 3 inches in depth, and the layer has a length and a width wherein the ratio between the length and the width is less than 50. The total porosity of the porous pavement is greater than 0.10.

30. Process; Substrate SSA>0.1 $m^2$/gm and Amphoteric Coating from Immersion

One embodiment includes a process for producing a sorptive-filtration media for the capture of waterborne or airborne constituents and particulates. The process comprises the steps of providing a substrate having a specific surface area (SSA) of greater than 0.1 $m^2$/gm, introducing the substrate to a solution (through mixing and partial immersion) such as a metal salt or oxide solution, of one or a combination of aluminum, manganese, iron and silicon compounds and volatilizing or drying the solution, leaving a coating on the substrate (including inside the outer surface of the substrate for porous substrates). This resulting coated substrate has amphoteric properties in aqueous solution.

31. Process; Substrate SSA>0.1 $m^2$/gm and Amphoteric Coating from Spraying

Another embodiment includes a process for producing a sorptive-filtration media for the capture of waterborne or airborne constituents and particulates. The process comprises the steps of providing a substrate having a specific surface area (SSA) of greater than 0.1 $m^2$/gm, introducing the substrate to a solution such as a metal salt or oxide solution, of one or a combination of aluminum, manganese, iron and silicon compounds by spraying the solution onto the substrate or passing the substrate through a spray, and volatilizing or drying the solution, leaving a coating on the substrate (including inside the outer surface of the substrate for porous substrates). This resulting coated substrate has amphoteric properties in aqueous solution.

32. Process; Cementitious Coating with Admixture

Another embodiment includes a process for producing a sorptive-filtration media for the capture of waterborne or airborne constituents and particulates. The process comprises the steps of coating a substrate with a cementitious coating wherein the aqueous fraction of the water:cement ratio includes a solution of one or a combination of aluminum, manganese, iron and silica oxide or salt compounds. This coating with an admixture is dried on the substrate with or without the benefit of drying aids such as additional temperature, enhanced vapor gradients or convective gradients.

33. Process; Cementitious Coating with Amphoteric Coating

Another embodiment includes a process for producing a sorptive-filtration media for the capture of waterborne or airborne constituents and particulates. The process comprises the steps of coating a substrate with a cementitious coating. This coating is dried on the substrate with or without the benefit of drying aids such as additional temperature, enhanced vapor gradients or convective gradients. The cementitious coated substrate is contacted with a solution of metal salt or oxide solution, of one or a combination of aluminum, manganese, iron and silicon compounds. The contact method is either through mixing, immersion or spraying. The coating of metal salt or oxide solution on the surface is volatilized or dried, leaving a coating on (and within) the cementitious coating.

34. Process; Cementitious Media with Admixture

Another embodiment includes a process for producing a sorptive-filtration media for the capture of waterborne or airborne constituents and particulates. The process comprises the steps of creating a substrate from cement and an aqueous solution where the aqueous solution is comprised, in part, of solution of one or a combination of aluminum, manganese, iron and silica oxide or salt compound. The substrate slurry, paste or mixture is cured, and formed or made into granular media of a chosen size gradation and functions as a sorptive-filtration media.

35. Process; Cementitious Media Containing Aggregate with Admixture

Another embodiment includes a process for producing a sorptive-filtration media for the capture of waterborne or airborne constituents and particulates. The process comprises the steps of creating a substrate from cement, fine or coarse aggregate, and an aqueous solution including a solution of one or a combination of aluminum, manganese, iron and silica oxide or salt compound. The substrate slurry, paste or mixture is cured and formed or made into granular media of a chosen size gradation and functions as a sorptive-filtration media.

36. Process; Cementitious Media w/Aggregate, w/Admixture and Amphoteric Coating

Another embodiment includes a process for producing a sorptive-filtration media for the capture of waterborne or airborne constituents and particulates. The process comprises the steps of creating a substrate from cement and an aqueous solution where the aqueous solution includes a first solution of one or a combination of aluminum, manganese, iron and silica oxide or salt compound. The substrate can be created with or without fine or coarse aggregate. The substrate slurry, paste or mixture is cured and formed or made into granular media of a chosen size gradation and functions as a sorptive-filtration media. The resulting sorptive-filtration substrate is introduced to a second solution (by mixing, immersion or spraying) such as a solution of one or a combination of aluminum, manganese, iron and silica oxide or salt compound (which may be the same as or different from the first solution), and volatilizing or drying the solution, leaving a coating on the substrate (or inside the outer surface of the substrate for porous substrates). This resulting coated substrate is a sorptive-filtration media.

37. Embodiment 30 through 36 Resulting in Media with Specific Gravity between 0.2 and 1.0

Another embodiment is a sorptive-filtration media formed through a process of providing a granular media with a specific gravity between about 0.1 and about 0.9 and applying to said granular media an amphoteric cementitious substance formed by any method, including embodiments 30-36, in a full or partial coating of said media. In certain embodiments, the thickness of the coating will be such that the total specific gravity of the coated media will be less than 1. In these embodiments, lower composite specific gravities will require thinner coatings, down to about 50 microns, whereas higher specific gravities (up to 1) can be achieved with thicker coatings (depending in the density of the substrate) of up to about 1 mm.

38. Embodiment 30 through 36 Resulting in Media with Specific Gravity between 1.0 and 6.0

Another embodiment is a sorptive-filtration media formed through a process of providing a granular media with a specific gravity between about 1.0 and about 6.0 and applying to said granular media an amphoteric cementitious substance formed by any method, including embodiments 30-36, in a full or partial coating of said media. Another embodiment employs a media having a specific gravity of between about 2.4 and about 0.3 (non-limiting examples of which are perlite and pumice). This latter embodiment could have a size range from about 0.5 mm to about 100 mm. The specific gravity of perlite is 2.2 to 2.4, but the bulk density of perlite is much lower (about 0.4 to 0.8) since it is filled with voids. The specific gravity of pumice is 0.6 to 0.7 and the bulk density is about 0.4 to 0.6. One size range for this material that is suitable for filtration is about 0.8 mm to 10 mm.

39. Process, Production of CPP with w/c<1 WITHOUT Amphoteric Coating/Admixture

Another embodiment includes a method for producing a porous, cementitious material. The method includes the steps of providing and thoroughly mixing cement and fine and/or coarse aggregate, mixing water with the cement and aggregate into a slurry while maintaining a water to cement ratio of less than one, initiating curing of the slurry under pressure and in the presence of steam, and continuing the curing at ambient temperature and pressure until the cementitious material is substantially dry. Another embodiment of this is to carry out curing at ambient pressure, temperature and humidity. The total porosity of the porous pavement is greater than 0.05.

40. Process, Production of CPP with w/c<1 and WITH Amphoteric Coating/Admixture

Another embodiment includes a method for producing a porous, cementitious material. The method includes the steps of providing and thoroughly mixing cement and aggregate, mixing an aqueous solution comprised of one or a combination of aluminum, manganese, iron and silicon oxide or salt compounds with the cement and aggregate into a slurry while maintaining the water (aqueous solution) to cement ratio of less than one, initiating curing of the slurry under pressure and in the presence of steam, and continuing the curing at ambient temperature and pressure until the cementitious material is substantially dry. Another embodiment of this is to carry out curing at ambient pressure, temperature and humidity. The total porosity of the porous pavement is greater than 0.05. In each embodiment 39-41, those embodiments could also be produced with a water to cement ratios of less than 0.9, less than 0.8, less than 0.7, less than 0.6, less than 0.5, or less than 0.4, less than 0.3, less than 0.25, or less than 0.15 (if cured in the presence of steam)

41. Process, Production of CPP WITHOUT Steam, with w/c<1 and Embodiment 35 and 36

Another embodiment includes a method for producing a porous, cementitious material. The method includes the steps of providing and thoroughly mixing cement and aggregate, mixing an aqueous solution comprised of one or a combination of aluminum, manganese, iron and silicon oxide or salt compounds with the cement and aggregate into a slurry while maintaining the water (aqueous solution) to cement ratio of less than one, initiating curing of the slurry under atmospheric pressure and continuing the curing at ambient temperature and pressure until the cementitious material is substantially dry. The total porosity of the porous pavement is greater than 0.05. This embodiment can also be produced without an amphoteric compound.

42. Aggregate for Shoulder Coated with Amphoteric Compound

Another embodiment is a roadway or pavement system with a shoulder formed of a cementitious granular material (e.g. aggregate formed of crushed concrete) for the removal of waterborne dissolved ionic, complexed or particulate-bound constituents. The roadway or pavement system comprises a pavement section and a gravel shoulder section adjacent to the pavement section. The sand to very coarse gravel-size material has a depth of at least 3 inches and includes sand, gravel, crushed or rubble material coated by an amphoteric compound of aluminum, manganese, iron and silicon or combination thereof.

43. Cementitious Aggregate for Shoulder Coated with Amphoteric Compound

Another embodiment is a roadway or pavement system with a cementitious granular shoulder for the removal of waterborne dissolved ionic, complexed or particulate-bound constituents. The roadway or pavement system comprises a pavement section and a cementitious granular shoulder section adjacent to the pavement section. The cementitious granular shoulder has a depth of at least 3 inches and includes cementitious granular or crushed cementitious, aggregate or rubble material coated by an amphoteric compound of aluminum, manganese, iron and silicon or combination thereof.

44. Cementitious Aggregate for Shoulder with an Admixture of Amphoteric Compound Another embodiment is a roadway or pavement system with a cementitious granular shoulder for the removal of waterborne dissolved ionic, complexed or particulate-bound constituents. The roadway or pavement system comprises a pavement section and a cementitious granular shoulder section adjacent to the pavement section. The cementitious granular shoulder has a depth of at least 3 inches and includes cementitious granular or crushed cementitious, aggregate or rubble material made with an admixture of amphoteric compound of aluminum, manganese, iron and silicon or combination thereof.

45. Amphoteric Sub-Base or Base Material

Another embodiment includes a method of constructing a sub-base or base subgrade for the removal of waterborne constituents. The method includes the steps of placing a layer of uncompacted sub-base or base material; distributing upon the layer or mixing in the layer a solution containing an amphoteric compound of aluminum, manganese, iron and silica oxide or salt, or combination thereof, and compacting or densifying the layer to a selected density.

46. Amphoteric Sub-Base or Base Material with Cementitious Admixture

Another embodiment includes a method of constructing a sub-base or base subgrade for the removal of waterborne constituents. The method includes the steps of placing a layer of uncompacted sub-base or base material; distributing upon the layer or mixing in the layer a solution or slurry containing cement, lime or pozzolanic material and amphoteric compound of aluminum, manganese, iron and silica oxide or salt, or combination thereof, mixing in and compacting or densifying the layer to a selected density.

47. Amphoteric Sub-Base or Base Material with Cementitious Admixture

Another embodiment is a sorptive-filtration medium for the capture of waterborne or airborne constituents. The media comprises a flexible, thin (less than 30 cm), planar, porous substrate such as a synthetic or natural geotextile, geosynthetic or geocomposite substrate material; and an amphoteric compound of aluminum, manganese, iron and silica oxide or salt applied to the substrate.

48. 3-d Flexible Porous, Hydraulically-Conductive Medium with Amphoteric Coating Another embodiment is an sorptive-filtration medium for the capture of waterborne or airborne constituents. The medium comprises a flexible, 3-dimensional, hydraulically-conductive porous substrate matrix; and an amphoteric compound or combination of aluminum, manganese, iron and silicon oxide or salt applied to the substrate matrix. In this application, hydraulically-conductive relates to the ability of the medium to conduct liquid or gas through the medium. The medium is a planar medium that has a thickness of greater than 1 mm. This medium can be formed into irregular or regular geometries and is deformable yet possesses sufficient strength to retain a pre-determined shape under it's own weight or without peripheral containment required to retain a pre-determined shape. Non-limiting examples of such hydraulically conductive matrix include porous foams, woven and non-woven geosynthetics, or mats of natural fiber materials.

49. 3-d Flexible Porous Polymeric Medium with Amphoteric Coating

Another embodiment is a sorptive-filtration medium for the capture of waterborne or airborne constituents. The media comprises a flexible, 3-dimensional, porous natural or polymeric substrate such as a geosynthetic; and an amphoteric compound or combination of aluminum, manganese, iron and silica oxide or salt applied to the substrate.

50. 3-d Flexible Porous Medium (as in Embodiment 48 and 49) with Cementitious Coating Another embodiment is a sorptive-filtration medium for the capture of waterborne or airborne constituents. The media comprises a flexible, 3-dimensional, porous natural or polymeric substrate such as a geosynthetic; and a cementitious coating with either an admixture containing an amphoteric compound or combination of aluminum, manganese, iron and silica oxide or salt, or a coating of the compound(s).

51. Drainage Pipe or Fixture with Amphoteric Coating

Another embodiment is a drainage pipe, hydraulic system or fixture capable of capturing waterborne or airborne constituents. The pipe, system, conveyance structure or fixture has an an interior surface, at least a portion of the surface being designed to be in contact with water or gas. One example is a pipe sewer. An amphoteric compound or combination of compounds is then applied to the portion of the surface designed to be in contact with the fluid.

52. Media or Medium with Multiple Layers of Amphoteric Coatings

Another embodiment of the invention includes a process for creating a sorptive-filtration media or medium for the capture of waterborne or airborne constituents. The process comprises the steps of providing a substrate (inorganic, organic, cementitious, earthen, rock, non-cementitious, pozzolanic) and applying a first coating of an oxide compound to the substrate; and applying a second coating of another oxide compound to the first coating. This coating process can continue for "n" layers of differing or similar oxide coatings.

53. Media or Medium with Cementitious Coating and Multiple Layers of Amphoteric Coatings Another embodiment of the invention includes a process for creating a sorptive-filtration media or medium for the capture of waterborne or airborne constituents. The process comprises the steps of providing a substrate (inorganic, organic, cementitious, earthen, rock, non-cementitious, pozzolanic), applying a cementitious layer to dryness, and then applying a first coating of an oxide compound to the substrate; and applying a second coating of another oxide compound to the first coating. This coating process can continue for "n" layers of differing or similar oxide coatings.

54. Shoulder with Amphoteric Admixture/Coatings

Another embodiment of the invention includes a roadway with a shoulder or any paved area forming a filter for dissolved ionic, complexed or particulate-bound species. The roadway or paved area comprises a paved section such as a traveled pavement and a cementitious, porous, shoulder adjacent the paved section and the shoulder having an amphoteric compound or combination of amphoteric compounds applied thereto, or admixture thereof as part of the water:cement ratio. The total porosity ranges from approximately 0.05 to 0.6.

55. Paved Porous Area with Amphoteric Admixture/Coatings

Another embodiment of the invention includes any paved area forming a filter for dissolved ionic, complexed or particulate-bound species. The paved area is comprised of cementitious, porous material having an amphoteric compound or combination of amphoteric compounds applied or bonded thereto, or admixture thereof as part of the water:cement ratio. The total porosity ranges from approximately 0.05 to 0.6.

56. Porous Media with Amphoteric Admixture/Coatings

Another embodiment provides a sorptive-filtration media having a porous structure of a fixed matrix and a total porosity of approximately 0.05 to 0.6 and an amphoteric compound or combination of amphoteric compounds applied thereto or as an admixture thereof.

57. Porous Pavement with or Without Amphoteric Admixture/Coatings

Another embodiment includes a method for forming a porous pavement roadway. This method includes the steps of providing and thoroughly mixing cement and aggregate; mixing water with the cement and aggregate forming it into a slurry while maintaining a water to cement ratio of less than one; and placing the slurry into a roadway bed. The total porosity ranges from approximately 0.05 to 0.6. The water:cement ratio can be made with or without an amphoteric compound or combination of aluminum, manganese, iron and silica oxide or salt.

Applications of the above embodiments include without limitation pavement systems, media systems, clarifiers, filters, hydrodynamic systems, transportation systems. Other embodiments include in-situ systems such as in-situ partial exfiltration systems where the container may be a synthetic polymeric or natural material such as a geosynthetic serving as the containing interface between the media and the surrounding soil environment. Still further non-limiting applications include inlets or catch-basins for storm water, wastewater, natural flows or anthropogenic flows such as industrial flows, end of conduit discharges, hydrodynamic or volumetric separation systems, directed discharges from elevated infrastructure such as downspouts, building drains or bridge drainage, or as inserts in or appurtenances to unit operations and processes (UOPs). Specific embodiments of this last application include in-line or off-line adsorptive-filtration of discharges from these UOPs, for example treatment of discharges from a basin or clarifier that might provide preliminary or primary treatment, application of the sorption-filtration media or fixed medium as a direct primary treatment, or inclusion of the sorptive-filtration media within all or part of the volume of a unit operation or process (sometimes called best management practices, BMPs). Ex-situ applications before or after UOPs can include cartridge or tubular filters or fluidized bed sytems.

These in-situ or ex-situ media embodiments can be arranged in series; for example layers of media of differing size, differing coating, differing substrates, differing pzc or charge, differing specific gravity, differing conductivities, or differing substrates in a single fixed or flexible container or in separate fixed or flexible containers such as cartridges, tubes, compartments or zones. These in-situ or ex-situ medium embodiments such as cementitious porous pavement or 3-dimensional porous materials can also be arranged in series having differing characteristics. The relative proportion of these series will depend on the treatment performance desired for specific constituents (for examples metals or phosphorus) and for specific particle gradations. These in-situ or ex-situ embodiments can be arranged in series and include a process for producing a sorptive-filtration media for the capture of waterborne or airborne constituents and particulates. The process comprises the steps of providing a substrate with a specific surface area of greater than 0.1 $m^2/gm$, introducing the substrate to a solution such as a metal salt solution, of one or a combination of aluminum, manganese, iron and silicon compounds and volatilizing the solution, leaving a coating on the substrate (or inside the outer surface of the substrate for porous substrates). This resulting coated substrate has amphoteric properties in aqueous solution. All of these variations are intended to come within the scope of the following claims.

The invention claimed is:

1. A filtration system for removing waterborne constituents, comprising:
   a. an inflow conduit positioned to receive water runoff from a paved surface;
   b. a filter containment communicating with said inflow conduit such that at least part of said water runoff passes through said filter containment; and
   c. a granular filter media disposed within said filter containment, said filter media comprising an amphoteric material applied thereto, wherein said amphoteric material comprises at least one of aluminum oxide or manganese oxide, and wherein said filter media has a specific surface area of at least 20 $m^2/gram$.

2. The filtration system of claim 1, wherein said filter containment consists essentially of a porous mesh material substantially enclosing said media.

3. The filtration system of claim 1, wherein said filter media is a granular media bed having a porosity of between about 0.2 and about 0.7.

4. The filtration system of claim 1, wherein said amphoteric material comprises both an oxide of Si and at least one oxide of a metal selected from at least one of Al, Mn, or Fe.

5. The filtration system of claim 4, wherein said filter media comprises a first media having a Si oxide applied thereto and a second media having at least one oxide of at least one of Al, Mn, or Fe.

6. The filtration system of claim 1, wherein said filter containment comprises a porous textile or geotextile material.

7. The filtration system of claim 1, wherein said filter containment comprises a rigid material.

8. The filtration system of claim 1, wherein said filter containment comprises a porous mesh material and said porous mesh material comprises a wire mesh or a fabric mesh.

9. The filtration system of claim 1, wherein said filter system includes a rigid media housing and said filter containment is a flexible material generally shaped to fit within said media housing.

10. The filtration system of claim 3, wherein said filter media is a granular media having a hydraulic conductivity of between about 1.0 and about 0.000 1 cm/sec.

11. The filtration system of claim 1, wherein said media has a specific gravity of between about 0.2 and about 1.0.

12. The filtration system of claim 1, wherein said media comprises a granular substrate having an average diameter ranging from 0.1 mm to 100 mm.

13. A filtration system for removing waterborne constituents from water runoff, comprising:
   a. a flow comprising water runoff from a paved surface;
   b. a filter containment communicating with said flow such that at least part of said flow passes through said filter containment; and
   c. a cementitious granular filter media disposed within said filter containment, said filter media comprising an amphoteric material applied thereto, wherein said amphoteric material comprises at least one oxide of a metal selected from at least one of Fe, Al, Mn, or Si.

14. The filtration system of claim 13, wherein individual media elements of said filter media have a hydraulic conductivity of between about 0.0001 and 1.0 cm/s.

15. The filtration system of claim 1, wherein a size of granules in said filter media is between 0.2 mm and 10 mm.

16. The filtration system of claim 13, wherein said filter media comprises individual granules having a hydraulic conductivity of between about 0.0001 and about 1.0 cm/sec.

17. The filtration system of claim 3, wherein said media bed comprises individual granules having a porosity of between about 0.05 and about 0.6.

18. A filtration system for removing waterborne constituents, comprising:
   a. a flow comprising water runoff from a substantially impermeable surface;
   b. a filter containment communicating with said flow such that at least part of said flow passes through said filter containment; and
   c. a granular filter media disposed within said filter containment, said filter media comprising an amphoteric material applied thereto, wherein said amphoteric material comprises at least one of aluminum oxide or manganese oxide.

19. The filtration system of claim 18, wherein said filter media has a specific surface area of at least 20 $m^2/gram$.

20. A filtration system for removing waterborne constituents, comprising:
   a. a rigid media housing;
   b. a filter containment comprising a porous mesh material positioned in said media housing; and
   c. a granular filter media disposed within said filter containment, said filter media comprising an amphoteric material applied thereto, wherein said amphoteric material comprises at least one of aluminum oxide or manganese oxide.

21. The filtration system of claim 20, wherein said porous mesh material is a wire mesh.

22. The filtration system of claim 20, wherein a flow comprising water runoff from a roadway pavement communicates with said media housing.

23. The filtration system of claim 20, wherein said media comprises at least one of perlite, fired silt, fired clay, or pumice.

24. The filtration system of claim 23, wherein said media has a hydraulic conductivity of between about 0.0001 and about 1.0 cm/sec.

25. The filtration system of claim 1, wherein said filter media comprises at least a first media having either manganese oxide or alumina oxide bonded thereto and a second media having a different amphoteric compound bonded thereto, said different amphoteric compound being either aluminum oxide, manganese oxide, silicon oxide, or iron oxide.

26. The filtration system of claim 25, wherein said first media and said second media are position in separate layers in said filter containment.

27. The filtration system of claim 1, wherein flow comprises diffuse flows.

28. The filtration system of claim 19, wherein said filter containment is an in-situ system.

29. The filtration system of claim 19, wherein said filter containment is an ex-situ system.

30. The filtration system of claim 1, wherein said filter containment is position within a volumetric separation system or said filter containment receives said flow from a volumetric separation system.

31. The filtration system of claim 20, wherein said media housing is formed to direct flow in an axial direction or a radial direction through said media.

32. A filtration system for removing waterborne constituents, comprising:
   a. an inflow conduit positioned to receive water from a unit operation and process system;
   b. a filter containment communicating with said inflow conduit such that at least part of said water runoff passes through said filter containment; and
   c. a granular filter media disposed within said filter containment, said filter media comprising an amphoteric material applied thereto, wherein said amphoteric material comprises at least one of an aluminum oxide, an iron oxide, a manganese oxide or silica, and wherein said filter media has a specific surface area of at least 20 $m^2$/gram.

* * * * *